United States Patent
Bansal

(10) Patent No.: US 9,923,772 B2
(45) Date of Patent: Mar. 20, 2018

(54) INTERFREQUENCY AND INTER-TECHNOLOGY NEIGHBOR PLANNING ON A SELF-ORGANIZING NETWORK

(71) Applicant: CISCO TECHNOLOGY, INC., San Jose, CA (US)

(72) Inventor: Ashish Bansal, Frisco, TX (US)

(73) Assignee: Cisco Technology, Inc., San Jose, CA (US)

( * ) Notice: Subject to any disclaimer, the term of this patent is extended or adjusted under 35 U.S.C. 154(b) by 633 days.

(21) Appl. No.: 14/333,261

(22) Filed: Jul. 16, 2014

(65) Prior Publication Data

US 2016/0021571 A1 Jan. 21, 2016

(51) Int. Cl.
*H04L 12/24* (2006.01)
*H04W 24/02* (2009.01)
(Continued)

(52) U.S. Cl.
CPC ......... *H04L 41/0893* (2013.01); *H04W 24/02* (2013.01); *H04W 36/0083* (2013.01); *H04W 84/18* (2013.01)

(58) Field of Classification Search
CPC . H04W 24/02; H04W 36/0083; H04W 84/18; H04W 28/085; H04W 16/10;
(Continued)

(56) References Cited

U.S. PATENT DOCUMENTS 6,005,855 A * 12/1999 Zehavi ............... H04B 7/18513
370/335
7,453,844 B1 * 11/2008 Lee ....................... H04W 72/08
370/329
(Continued)

FOREIGN PATENT DOCUMENTS

CN 105282754 A 1/2016
CN 105376802 A 3/2016
(Continued)

OTHER PUBLICATIONS

EPO Dec. 22, 2015 Extended Search Report and Opinion from European Application Serial No. 15176904.9.
(Continued)

*Primary Examiner* — Dung B Huynh
(74) *Attorney, Agent, or Firm* — Patterson + Sheridan, LLP

(57) ABSTRACT

In an example, a self-organizing network (SON) provides automated interfrequency load balancing for a base station such as a NodeB. The NodeB may provide a plurality of carriers, such as in a plurality of UARFCN frequencies, and the SON may provide configuration directives for increasing efficiency. For example, when one carrier becomes loaded, the SON may update neighbor associations to take advantage of relatively unloaded frequency carriers. A plurality of scenarios S may be provided, and a policy P may be defined for each. When the NodeB encounters a scenario S, SON may send configuration directives to implement policy P. Similar concept and policy could be applied in conjunction
(Continued)

with INTER Technology Neighbor Definitions between LTE and UMTS and UMTS and GSM. Example if GSM Frequency Neighbors needs to be replaced with different Frequency Neighbors from UMTS based on Load or RF conditions.

20 Claims, 19 Drawing Sheets

(51) Int. Cl.
    *H04W 84/18* (2009.01)
    *H04W 36/00* (2009.01)

(58) Field of Classification Search
    CPC ............ H04W 16/32; H04W 72/0486; H04W 84/045; H04W 92/20; H04L 41/0893; H04L 67/12
    See application file for complete search history.

(56) References Cited

U.S. PATENT DOCUMENTS

| | | | |
|---|---|---|---|
| 8,891,486 B1* | 11/2014 | Vivanco | H04W 4/00 370/331 |
| 2001/0039576 A1* | 11/2001 | Kanada | H04L 41/0893 709/223 |
| 2007/0081512 A1* | 4/2007 | Takeda | H04L 63/164 370/349 |
| 2008/0056150 A1* | 3/2008 | Kujala | H04L 41/0873 370/252 |
| 2008/0298333 A1* | 12/2008 | Seok | H04W 8/005 370/338 |
| 2009/0052333 A1* | 2/2009 | Vankov | H04L 43/50 370/242 |
| 2009/0248842 A1* | 10/2009 | Hashimoto | H04L 41/0893 709/221 |
| 2010/0299419 A1 | 11/2010 | Ramankutty et al. | |
| 2011/0075553 A1 | 3/2011 | Rahman | |
| 2011/0096687 A1 | 4/2011 | Dottling | |
| 2011/0158089 A1* | 6/2011 | Sambhwani | H04W 36/22 370/230 |
| 2011/0294527 A1 | 12/2011 | Brueck et al. | |
| 2012/0039175 A1* | 2/2012 | Sridhar | H04L 47/125 370/236 |
| 2012/0044935 A1* | 2/2012 | Hama | H04L 12/4625 370/389 |
| 2012/0264470 A1* | 10/2012 | Bajj | H04W 84/045 455/509 |
| 2012/0295609 A1* | 11/2012 | Li | H04W 24/04 455/423 |
| 2013/0086237 A1* | 4/2013 | Cutler | H04L 41/0893 709/223 |
| 2013/0242736 A1* | 9/2013 | Tarraf | H04W 24/02 370/235 |
| 2013/0331079 A1 | 12/2013 | Rácz | |
| 2014/0120969 A1* | 5/2014 | Sang | H04W 72/1215 455/501 |
| 2014/0241183 A1* | 8/2014 | Comeau | H04L 5/0098 370/252 |
| 2014/0369329 A1* | 12/2014 | Lee | H04W 28/06 370/338 |
| 2015/0105115 A1* | 4/2015 | Hata | H04W 28/0231 455/509 |
| 2015/0124676 A1* | 5/2015 | Song | H04L 1/1854 370/311 |
| 2015/0295832 A1* | 10/2015 | Cotter | H04L 47/125 370/235 |
| 2016/0021583 A1 | 1/2016 | Bansal | |
| 2016/0066238 A1* | 3/2016 | Zhang | G01S 5/0252 370/332 |

FOREIGN PATENT DOCUMENTS

| | | |
|---|---|---|
| EP | 1372347 | 12/2003 |
| EP | 1210828 B1 | 12/2011 |
| EP | 2975878 | 1/2016 |
| WO | 2014/023347 A1 | 2/2014 |

OTHER PUBLICATIONS

Lehser, Frank., "A Deliverable by the NGMN Alliance NGMN Top OPE Recommendations," NGMN Alliance, Sep. 21, 2010, 43 pages; XP055230800.

Ramiro, Juan and Khalid Hamied, Editors, *Self-Organizing Networks: Self-Planning, Self-Optimization and Self-Healing for GSM, UMTS and LTE*, pp. 47-61; 140-144; 185-191; and 207-218 only; Oct. 28, 2011, John Wiley & Sons, Ltd.; XP002751669.

Laselva, Daniela, et al., "Self-Optimization" in *LTE Self-Organizing Networks (SON)*, Dec. 9, 2011, John Wiley & Sons, Ltd., pp. 135-234.

U.S. Appl. No. 14/452,601, filed Aug. 8, 2014, entitled "Interfrequency and Inter-Techology Neighbor Planning on a Self-Organizing Network"; Inventor: Ashish Bansal.

USPTO Jan. 6, 2017 Non-Final Office Action from U.S. Appl. No. 14/452,601.

* cited by examiner

INTERFREQUENCY AND INTER-TECHNOLOGY NEIGHBOR PLANNING ON A SELF-ORGANIZING NETWORK

FIELD OF THE DISCLOSURE

This application relates to the field of telecommunications, and more particularly to policy automation in a telecommunication network related to Neighbor Definitions.

BACKGROUND

The Third-Generation Partnership Project (3GPP) is an organization that propagates wireless telecommunication standards and promotes their adoption. 3GPP has provided useful standards such as global system for mobile communication (GSM), enhanced data rates for GSM evolution (EDGE), code division multiple access (CDMA), universal mobile telecommunication system (UMTS), and long-term evolution (LTE).

Certain of these standards provide for a base station such as a NodeB, evolved node B (eNodeB), femtocell, home eNodeB (HeNB), or similar to operate one or more carriers on a defined UMTS Terrestrial Radio Access (UTRA) Absolute Radio Frequency Number (UARFCN). In one example UMTS specification based on 3GPP, UARFCN frequency carriers may have up to two interfrequency "SIB11 neighbor relations." These neighbor relations may provide, for example, for traffic on an overloaded carrier to overflow to a neighbor.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
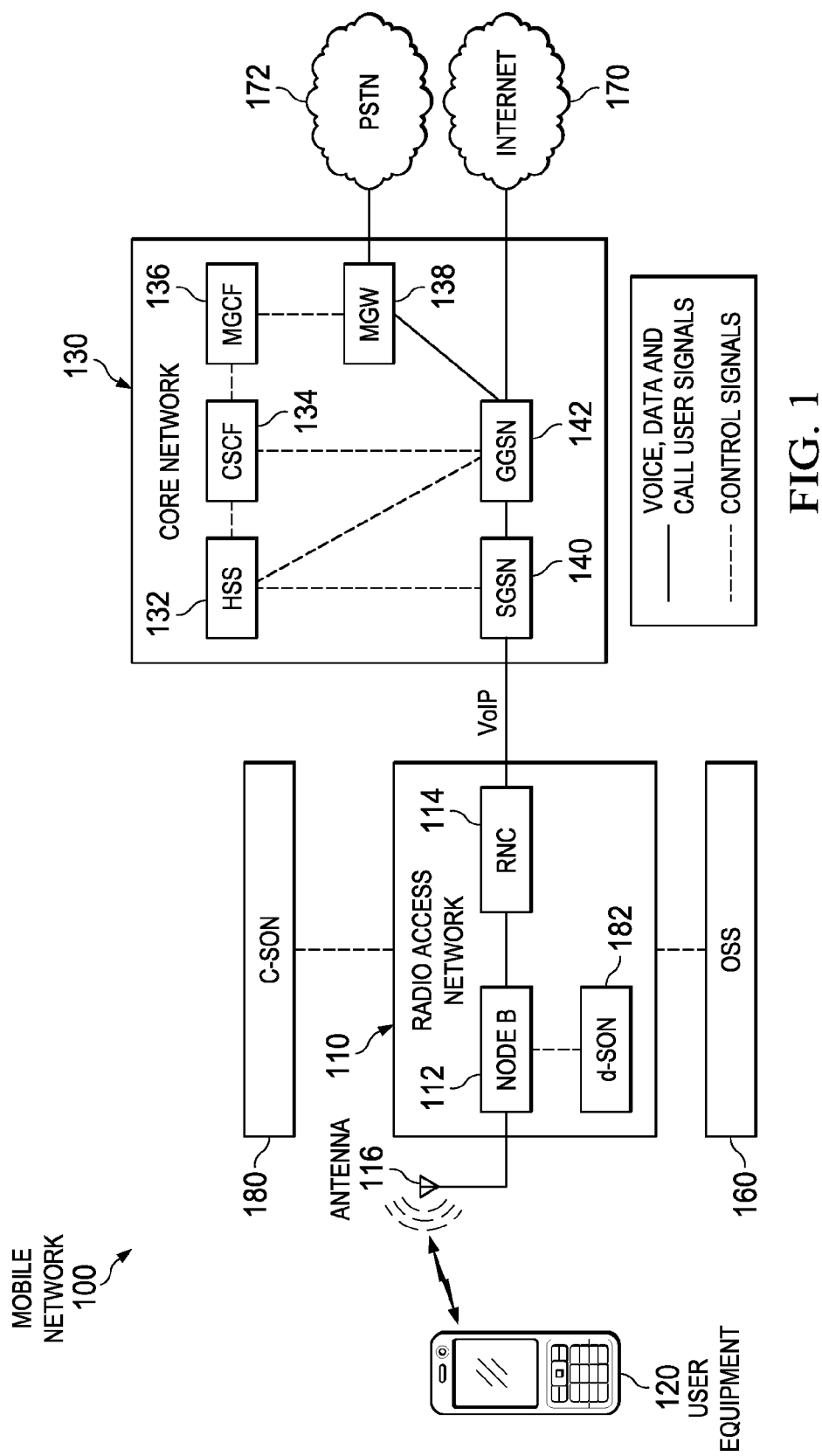
FIG. 1 is a network diagram of a telecommunication network according to one or more examples of the present Specification.

In an example, a self-organizing network (SON) provides automated interfrequency load balancing for a base station such as a NodeB. The NodeB may provide a plurality of carriers, such as in a plurality of UARFCN frequencies, and the SON may provide configuration directives for increasing efficiency. For example, when one carrier becomes loaded, the SON may update neighbor associations to take advantage of relatively unloaded frequency carriers. A plurality of scenarios S may be provided, and a policy P may be defined for each. When the NodeB encounters a scenario S, SON may send configuration directives to implement policy P. Similar concept and policy could be applied in conjunction with INTER Technology Neighbor Definitions between LTE and UMTS and UMTS and GSM. Example if GSM Frequency Neighbors needs to be replaced with different Frequency Neighbors from UMTS based on Load or RF conditions.

There is disclosed in a first example embodiment a network device comprising an interface for coupling with a telecommunication engine operable for providing wireless uplink and downlink communication services in a plurality of frequency carriers configured in a baseline configuration P0 with baseline neighbor associations; and a policy engine operable for: identifying a network condition scenario S1; locating a policy P1 associated with the scenario S1; and providing to the telecommunication engine configuration directives based on P1, wherein a neighbor association between a first frequency carrier and a second frequency carrier is updated to a neighbor association between the first frequency carrier and a third frequency carrier.

There is disclosed in a second example embodiment one or more computer-readable mediums having stored thereon instructions operable to instruct a processor for coupling with a telecommunication engine operable for providing wireless uplink and downlink communication services in a plurality of frequency carriers configured in a baseline configuration P0 with baseline neighbor associations; and providing a policy engine operable for identifying a network condition scenario S1; locating a policy P1 associated with the scenario S1; and providing to the telecommunication engine configuration directives based on P1, wherein a neighbor association between a first frequency carrier and a second frequency carrier is updated to a neighbor association between the first frequency carrier and a third frequency carrier.

There is disclosed in a third example embodiment a method comprising coupling with a telecommunication engine operable for providing wireless uplink and downlink communication services in a plurality of frequency carriers configured in a baseline configuration P0 with baseline neighbor associations; identifying a network condition scenario S1; locating a policy P1 associated with the scenario S1; and providing to the telecommunication engine configuration directives based on P1, wherein a neighbor association between a first frequency carrier and a second frequency carrier is updated to a neighbor association between the first frequency carrier and a third frequency carrier.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

FIG. 1 is a block diagram of a mobile network 100 according to one or more examples of the present Specification. Mobile network 100 includes user equipment 120 communicatively coupled, for example via a wireless antenna 116, to a radio access network (RAN) 110. RAN 110 may be communicatively coupled, for example via a voice over internet protocol (VOIP) to a core network 130. Core network 130 may in turn connect to various networks, such as the Internet 170, or a publically-switched telephone network (PSTN) 172, which provide access to one or more services. In one example, when UE 120 is participating in a telephone call, mobile network 100 provides voice call services via PSTN 172. In another example, when UE 120 is performing data operations, such as web applications, web surfing, e-mail, or other network operations, UE 120 connects to Internet 170 via mobile network 100. It should be noted, however, that PSTN 172 and Internet 170 are provided only as examples of their respective service classes, and that other classes of services may also be provided. Thus, it is not intended for these examples to limit mobile network 100 to the specific examples disclosed in this Application.

In this example, two classes of signals are passed within mobile network 100: voice, data, and call signals (referred to herein as the "user plane" signals) and control signals (referred to herein as the "control plane" signals).

In one example scenario, user plan signals originate from UE 120 and are passed to RAN 110. Within RAN 110, user plane signals are first received by a nodeB 112 (or other similar base station), which passes the "call" to radio network controller (RNC) 114. RNC 114 converts the call to a VOIP data stream, and provides it to core network 130.

Core network 130 may be, for example, a general packet radio service (GPRS) 2G, 3G, 3G+, or other network. Within this specification, a long-term evolution (LTE) network, often considered a 3G+ or 4$^{th}$-generation network, is used by way of example. It should be noted however that this is not intended to be limiting, and that any suitable network may be substituted.

In this example, core network 130 includes a serving GPRS support node (SGSN) 140 and a gateway GPRS support node (GGSN) 142.

SGSN 140 may be configured to receive data packets from and deliver data packets to mobile base stations, such as NodeB 112, within a geographical service area. SGSN 140 may provide packet routing and transfer, mobility management (attach/detach and location management), logical link management, and authentication and charging functions. Common SGSN functions include, by way of non-limiting example, detunneling GTP packets from GGSN 142 (downlink), tunneling IP packets toward GGSN 142 (uplink), carrying out mobility management, and billing user data. In GSM/EDGE configurations, SGSN 140 may provide additional functions including, by way of non-limiting example, providing a maximum data rate between 60 kBd to 150 kBd per subscriber; connecting to packet control units; accepting uplink data to form IP packets; encrypting downlink data; decrypting uplink data; and carrying out mobility management.

GGSN 142 is responsible for internetworking between a GPRS network and external networks such as Internet 170. GGSN 142 is thus the outward-facing node from the perspective of Internet 170, and a subnetwork sits behind GGSN 142. Thus, GGSN 142 hides from Internet 170 any GPRS infrastructure found within mobile network 100. In one example method, GGSN 142 receives a data addressed to a specific UE 120, and then verifies that the requested UE 120 is active on mobile network 100. If UE 120 is active, GGSN 142 forwards the data to SGSN 140, which provides the data to UE 120. On the other hand, if UE 120 is not active, the data is discarded.

Conversely, packets originating from UE 120 arrive at GGSN 142, and GGSN 142 directs the traffic to the right node (such as the correct IP address) on Internet 170. GGSN 142 may also be operable to convert GPRS packets coming from SGSN 140 into packet data protocol (PDP) format and send them out to Internet 170. In the opposite direction, PDP addresses of incoming data packets are converted to the GSM address of UE 120.

While GGSN 142 provides data traffic directly to Internet 170, voice traffic first passes through media gateway (MGW) 138 before proceeding to PSTN 172. In an example, MGW 138 translates digital media streams between different telecommunications networks such as PSTN, and next-generation networks such as 2G, 2.5G, 3G, 3G+, LTE, and so forth. This enables multimedia communications across next-generation networks over multiple transport protocols such as Asynchronous Transfer Mode (ATM) and IP.

MGW 138 may be controlled by a separate Media Gateway Controller Function (MGCF) 136, which provides call control and signaling functionality.

On the control plane, nodeB 112 and RNC 114 may be serviced by a centralized self-organizing network device (C-SON) 180 and an operations support system (OSS) 160. One or more distributed SON (dSON) devices may also be provided, for example attached to one or more NodeBs 112.

Media gateway controller function device (MGCF) 136 is an endpoint device for converting call protocols, for example between session initiation protocol (SIP) and ISDN user part (ISUP) protocols. MGCF 136 may control resources for MGW 138.

Call session control function (CSCF) 134 performs several roles of SIP servers or proxies, which collectively CSCF services, and which may be used in SIP signaling.

Home subscriber server (HSS) 132 provides functions of both a home location register (HLR) and authentication center (AuC).

SON provides an automation technology designed to make the planning, configuration, management, optimization and healing of mobile radio access networks simple and fast relative to manual configuration schemes. SON functionality and behavior has been defined and specified in recommendations produced by organizations such as 3GPP and others.

SON may be provided in several different flavors, including centralized SON (C-SON), distributed SON (dSON), and hybrid SON (hSON).

dSON functions are distributed between a plurality of network elements at the edge of the network, including one or more NodeBs 112. This provides localized functionality.

C-SON function are typically concentrated closer to higher-order network nodes, such as OSS 160, to allow a broader overview of more edge elements and coordination of functions such as load across a wide geographic area.

H-SON is a mix of centralized and distributed SON, combining elements of each in a hybrid solution.

Advantageously, SON provides useful functions such as:
a. Self-configuration. Self-configuration strives towards the "plug-and-play" paradigm such that new base stations are automatically configured and integrated into the network, and new features on a base station (including bringing online of new carrier frequencies) are also seamlessly integrated. Self-configuration may be supplied as part of the software delivery with each radio cell by equipment vendors. When a new base station is introduced into the network and powered on, it is immediately recognized and registered by the network. The neighboring base stations then automatically adjust to provide the required coverage and capacity, as well as to avoid the interference.
b. Self Optimization. A base station may contain many configuration parameters that control its operation. Each of these can be altered to change network behavior, based on observations of both the base station itself, and measurements at the mobile station or handset. One of the first SON features establishes neighbor relations automatically (ANR), while others optimize random access parameters or mobility robustness in terms of handover oscillations. A very illustrative use case is the automatic switch-off of a percent of base stations during the night hours. The neighboring base station would then re-configure their parameters in order to keep the entire area covered by signal. In case of a sudden growth in connectivity demand for any reason, the "sleeping" base stations "wake up" almost instantaneously. This mechanism leads to significant energy savings for operators.
c. Self Healing. When some nodes in the network become inoperative, self-healing mechanisms aim at reducing the impacts from the failure, for example by adjusting parameters and algorithms in adjacent cells so that other nodes can support the users that were supported by the failing node. In legacy networks, the failing base stations are at times hard to identify and a significant amount of time and resources are required to fix it. This function of SON permits to spot such a failing base stations immediately in order to take further measures, and ensure no or insignificant degradation of service for the users.

Figure 2:
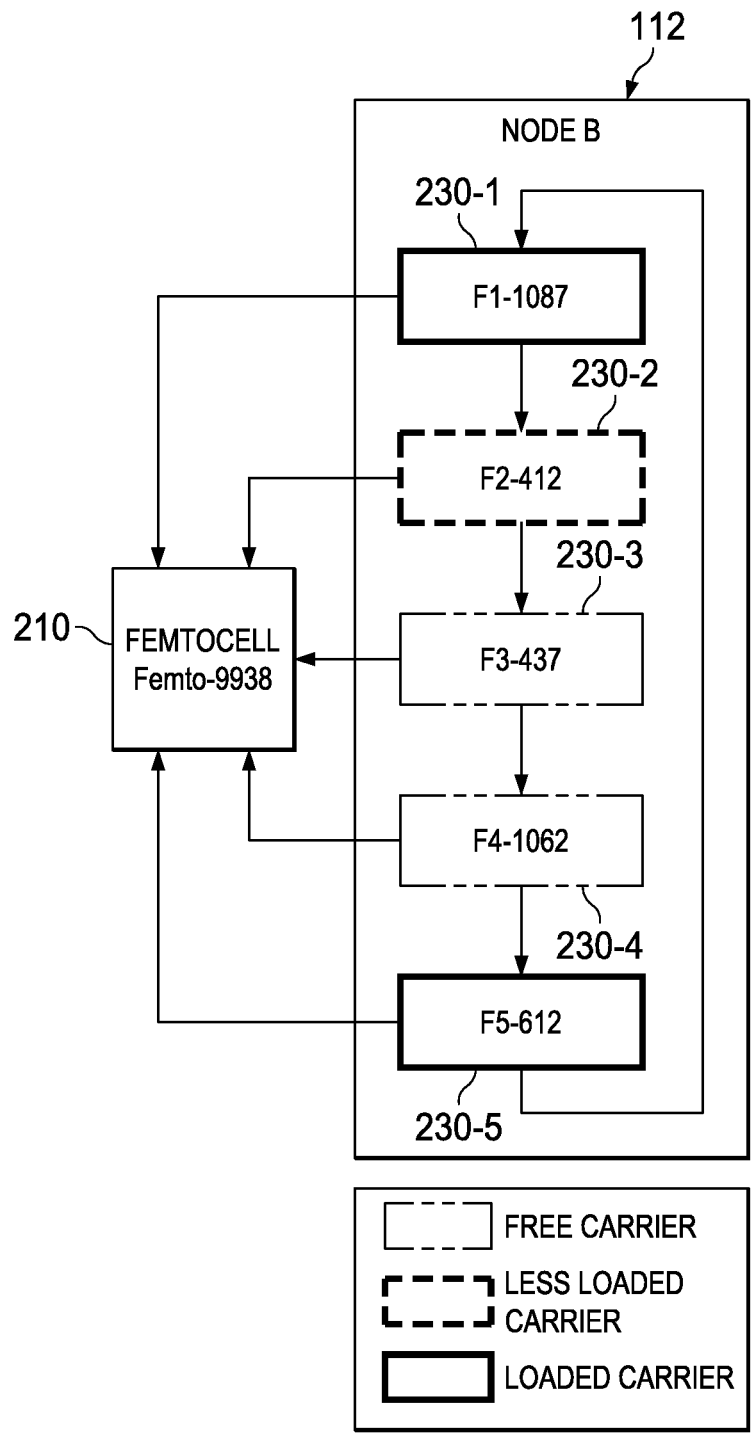
FIG. 2 is a block diagram of base station according to one or more examples of the present Specification.

FIG. 2 is a block diagram of frequency carriers 230 in NodeB 112 according to one or more examples of the present Specification. In this example, NodeB 112 is communicatively coupled to a femtocell 210, which may be any suitable small base station, such as an LTE home eNodeB (HeNB) or similar. It should also be noted that for the sake of simplicity of discussion, certain elements and network devices that may also be present, such as gateways, mobility management entities (MMES), and other network devices, have been omitted from this and other FIGURES.

In the example of FIG. 2, carrier F1 230-1 is assigned the frequency carrier designated by 1087. Carrier F2 230-2 is assigned to the 412 frequency carrier. Carrier F3 230-3 is assigned to the 437 frequency carrier. Carrier F4 230-4 is assigned to the 1062 frequency carrier. Carrier F5 230-5 is assigned to the 612 frequency carrier.

These frequency carrier designations are provided by way of example only, and it should be noted that any suitable combination of carriers may be used. In this example, the frequency carrier designations are UMTS Terrestrial Radio Access (UTRA) Absolute Radio Frequency Number (UARFCN) designators.

The UMTS frequency carriers are radio frequencies used by Universal Mobile Telecommunications System (UMTS) networks. The frequency carriers are allocated by a governing body and each is designated with an uplink and downlink nominal frequency, and may include designated uses.

As of the date of this Specification, UARFCNs may be looked up on the Internet, such as at http://niviuk.free.fr/umts_band.php. The example frequency carriers are as follows:

TABLE 1

| Carrier Frequencies | | | | | | |
|---|---|---|---|---|---|---|
| Carrier | Band | Name | UARFCN DL | Downlink (MHz) | UARFCN UL | Uplink (MHz) |
| F1 | 3 | 1800 DCS | 1312 | 1837.4 | 1087 | 1742.4 |
| F2 | 2 | PCS 1900 | 412 | 1932.5 | 12 | 1852.5 |
| F3 | 2 | PCS 1900 | 437 | 1937.5 | 37 | 1857.5 |
| F4 | 3 | 1800 DCS | 1287 | 1832.4 | 1062 | 1737.4 |
| F5 | 2 | PCS 1900 | 612 | 1972.5 | 212 | 1892.5 |
| Femto | 2 | 1900 PCS | 9938 | 1987.6 | 9538 | 1907.6 |

These example carriers are used throughout the Specification, by way of example only, to illustrate an example of intercarrier load balancing. It will be recognized, however, that these carrier selections are not limiting, and that any suitable carrier arrangement may be used.

In certain embodiments, such as according to the UMTS $3^{rd}$ Generation Partnership Project (3GPP) specification, each carrier 230 may have no more than two interfrequency "neighbor" relations, in this example femtocell 210 and the next deployed UMTS carrier. In certain known embodiments, these neighbor relations may be statically defined by an engineering process. Among other things, the neighbor relation enables traffic to "overflow" to a neighboring carrier when the carrier to which the traffic is directed cannot handle the traffic. Furthermore, in certain embodiments of LTE, each carrier 230 must have a unique UARFCN to communicate with femtocell 210.

Thus, in an example of FIG. 2, carrier F1 230-1 has an inter-frequency neighbor relationship with femtocell 210 and with carrier F2 230-2. Carrier F2 230-2 has a neighbor relation with femtocell 210 and with carrier F3 230-3. Carrier F3 230-3 has a neighbor relation with femtocell 210 and with carrier F4 230-4. Carrier F4 230-4 has neighbor relation with femtocell 210 and with carrier F5 230-5. Carrier F5 230-5 has a neighbor relation with femtocell 210, and loops back to carrier F1 230-1, creating a closed-loop neighbor relation system. Femtocell 210 operates on the 9938 carrier.

As may be seen in FIG. 2, this static arrangement may lead to a situation in which carriers 230 are not optimally arranged. For example, carriers F1 230-1 and F5 230-5 may be designated in this example as "loaded carriers." This means that these two carriers are heavily loaded. Carrier F2 230-2 may be designated as a "less loaded carrier." This means that while carrier F2 230-2 is handling some traffic, it is not handling as much traffic as carriers F1 230-1 and F5 230-5. Thus, although carrier F2 230-2 is somewhat loaded, it may have substantially more available bandwidth than carriers F1 230-1 and F5 230-5. Finally, carriers F3 230-3 and F4 230-4 may be designated as "free carriers." This means that these two carriers have substantially no traffic.

It is evident that this arrangement may lead to certain difficulties. For example, the neighbor relation between carrier F5 230-5 and carrier F1 230-1 may present difficulties. Because carrier F1 230-1 is heavily loaded, when carrier F5 230-5 tries to provide traffic handover, carrier F1 230-1 may not have available bandwidth to handle the traffic. This may lead to dropped calls or packets. In the meantime, carriers F3 230-3 and F4 230-4 remain completely free, while carrier F2 230-2 remains partly free. This may result in non-optimal operating conditions for NodeB 112, which may result in unacceptable network performance.

Dropped calls, dropped packets, or other sub-optimal network operations such as the inability of a UE 120 to connect to the network may negatively affect key performance indicators (KPIs) for a network, which can affect a network's effectiveness as well as its commercial viability. Thus, in certain embodiments it is beneficial to improve KPIs by improving network efficiency.

In certain embodiments, C-SON 180, alone or in conjunction with dSON 182 and OSS 160, may be provided with a policy engine 1624 (FIG. 16), which may be provided with a plurality of rules for defining scenarios and associated policies. In one example, a plurality of scenarios are provided S0 . . . Sn. Each scenario S may be defined by a certain cross section of network conditions. A number of policies are also defined P0 . . . Pk. Policies may be defined to respond to the network condition scenarios.

Figure 15:
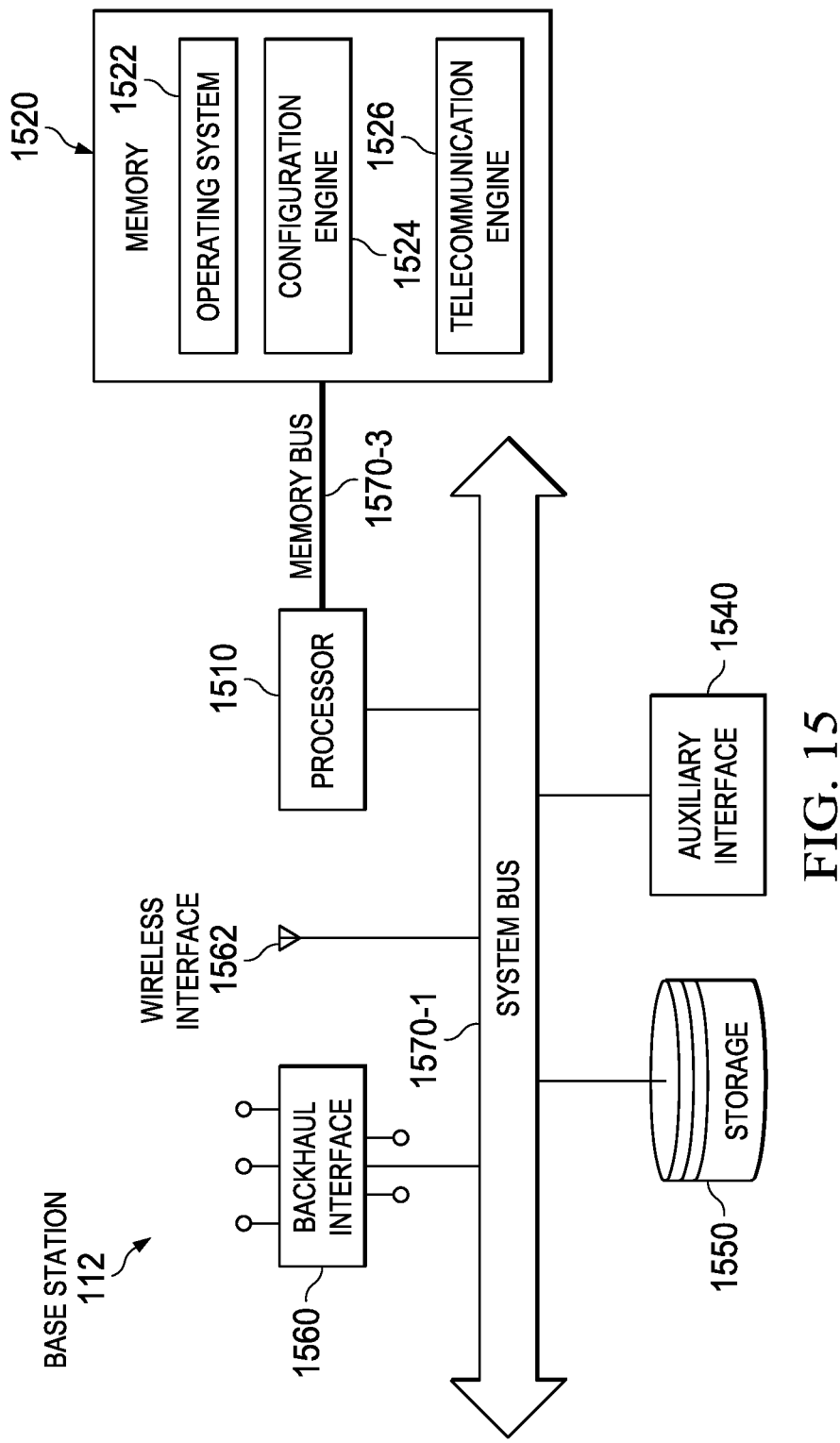
FIG. 15 is a block diagram of a base station according to one or more examples of the present Specification.

C-SON 180 or a similar network device may include a communication interface for coupling with NodeB 112, which itself includes a telecommunication engine 1526 (FIG. 15). Telecommunication engine 1526 is operable for providing wireless uplink and downlink communication services in a plurality of frequency carriers configured in a baseline configuration P0 with baseline neighbor associations.

Policy engine 1624 of C-SON 180 is operable for identifying a network condition scenario S1; locating a policy P1 associated with the scenario S1; and providing to telecommunication engine 1526 configuration directives based on P1, wherein a neighbor association between a first frequency carrier and a second frequency carrier may be updated to a neighbor association between the first frequency carrier and a third frequency carrier. This configuration is provided by way of example, to illustrate an embodiment where SON functionality resides externally to NodeB 112. It is, however, possible to also provide SON functionality internally to NodeB 112. In that case, the procedure described above may be identical, except that the communication interface may be internal to NodeB 112 rather than an interface to an external network.

Figure 3:
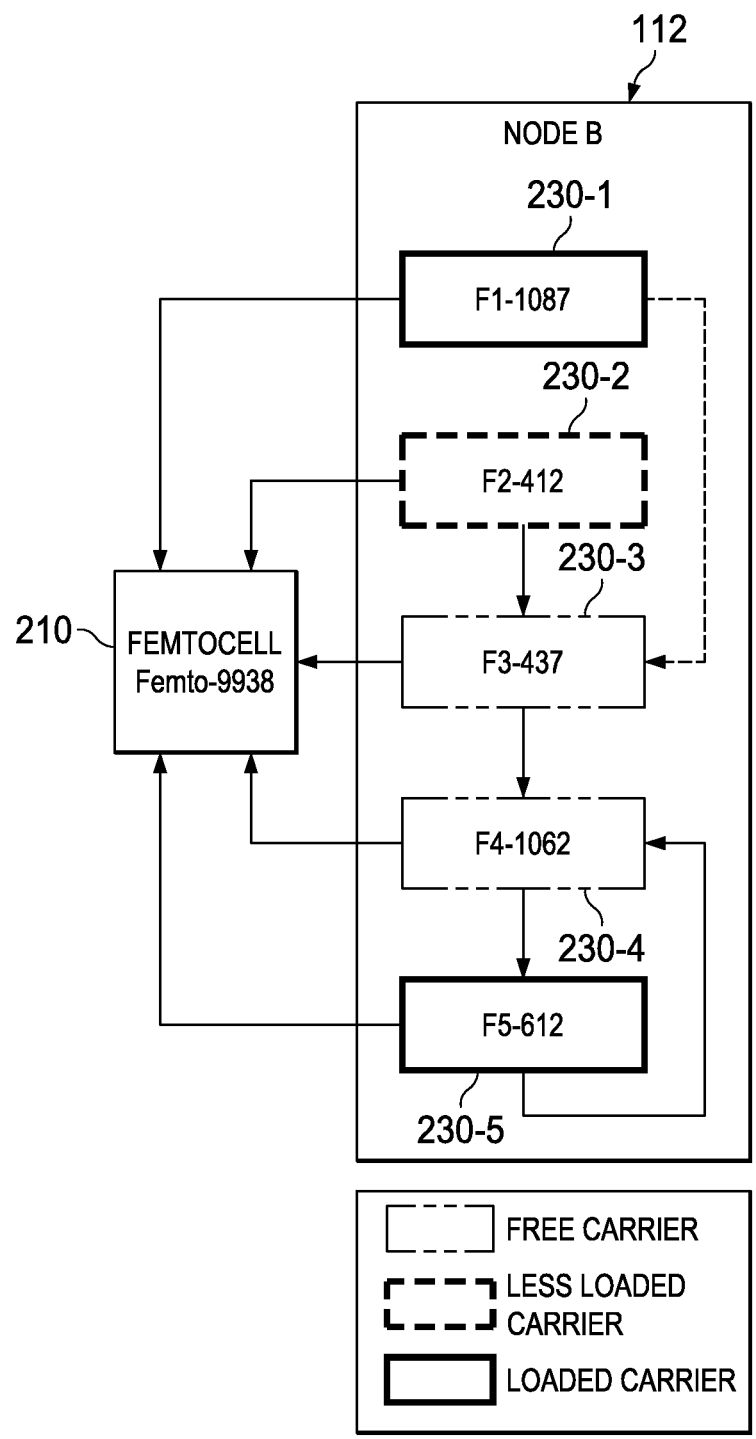
FIG. 3 is a block diagram of base station according to one or more examples of the present Specification.

FIG. 3 is a block diagram of a modified NodeB 112 according to one or more examples of the present Specification. In this example, as in the example of FIG. 2, NodeB 112 is communicatively coupled to a femtocell 210. In the example of FIG. 3, the carriers 230 each have, by way of example, the same loading as disclosed in connection with FIG. 2. Specifically, carriers F1 230-1 and F5 230-5 are loaded. Carrier F2 230-2 is less loaded. Carriers F3 203-3 and F4 203-4 are free carriers. In this example, however C-SON 180 has provided to NodeB 112 configuration directives for redesignating the neighbor relations of carriers 230.

Specifically, rather than having a neighbor relation to carrier F2 230-2, carrier F1 230-1 now has a relation with carrier F3 230-3. This allows overflow traffic from heavily loaded carrier F1 230-1 to flow to free carrier F3 203-3. Similarly, carrier F5 230-5 loops back to carrier F4 230-4 rather than back to carrier F1 230-1. Again, this allows traffic to flow to a less loaded carrier.

In certain embodiments, the scenario of a plurality of carriers requiring reconfiguration to optimally assigned neighbor relations may be designated as S, with a scenario number such as S1. There may be related to scenario S1 a policy, such as policy P1. In certain embodiments, C-SON 180 may identify scenario S1 in advance. Thus, when C-SON 180 determines that scenario S1 has been encountered, C-SON 180 already has a defined policy P1 for dealing with scenario S1. Specifically, scenario P1 requires neighbor relations to be updated such that loaded carriers relate to less loaded carriers. Optimally, loaded carriers relate free carriers, and less loaded carriers also relate to free carriers.

It will be recognized, however, that this may direct a substantial amount of traffic to a free carrier, such as carrier F3 230-3. Thus, after a time, it may be necessary to assess the effectiveness of the policy in this particular instance. If it is found that carrier F3 230-3 has now become a loaded carrier, then neighbor relations may need to be reconfigured to take better advantage of available carriers. Also in certain embodiments, C-SON 180 may be configured to direct NodeB 112 to return to its baseline configuration policy P0, associated with scenario S0. This ensures that NodeB 112 does not get stuck for a long time in an exotic configuration. If it is found that network conditions degrade after any change, the change may be reverted.

Figure 4:
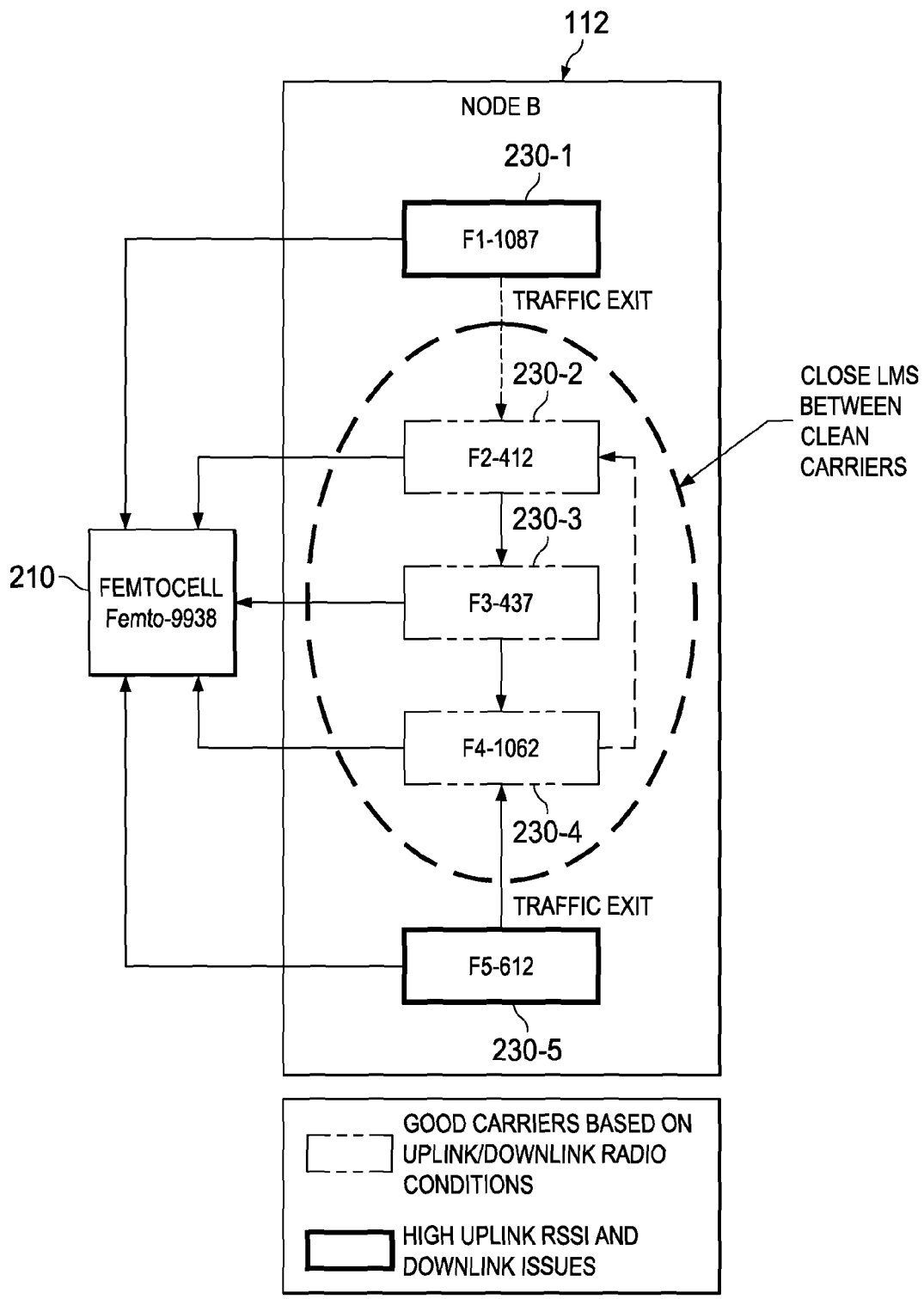
FIG. 4 is a block diagram of base station according to one or more examples of the present Specification.

FIG. 4 is a block diagram of NodeB 112 according to one or more examples of the present Specification. In this example, a scenario S is presented wherein significant interfrequency interference may occur where two frequency carriers have widely separate values. For example, carriers F1 230-1 and F5 230-5 have strong received signal strength indicators (RSSIs) and are widely separated in their frequency carriers. Thus they are designated and "high interference" carriers. However, carriers F2 230-2, F3 230-3, and F4 230-4 have much closer frequency carriers, and thus are more likely to have clean intercarrier lines. These are designated as relatively "clean" carriers. Thus a policy P is defined to group together clean carriers, and to avoid linking high interference carriers.

In this example, carriers F1 230-1, F2 230-2, F3 230-3, and F4 230-4 are arranged linearly as in policy P0 of FIG. 1. However, in FIG. 3, carrier F4 does not link down to carrier F5 230-5, and carrier F5 230-5 does not feed back to carrier F1 230-1, which may be a candidate for interference. Rather F5 230-5 has a neighbor relation to carrier F4 230-4. Carrier F4 230-4 feeds back to carrier F2 230-2, creating a closed-loop arrangement of clean carriers. This arrangement helps to eliminate interference, because traffic will allows flow into the clean carrier block and will not cascade out of it.

Figure 5:
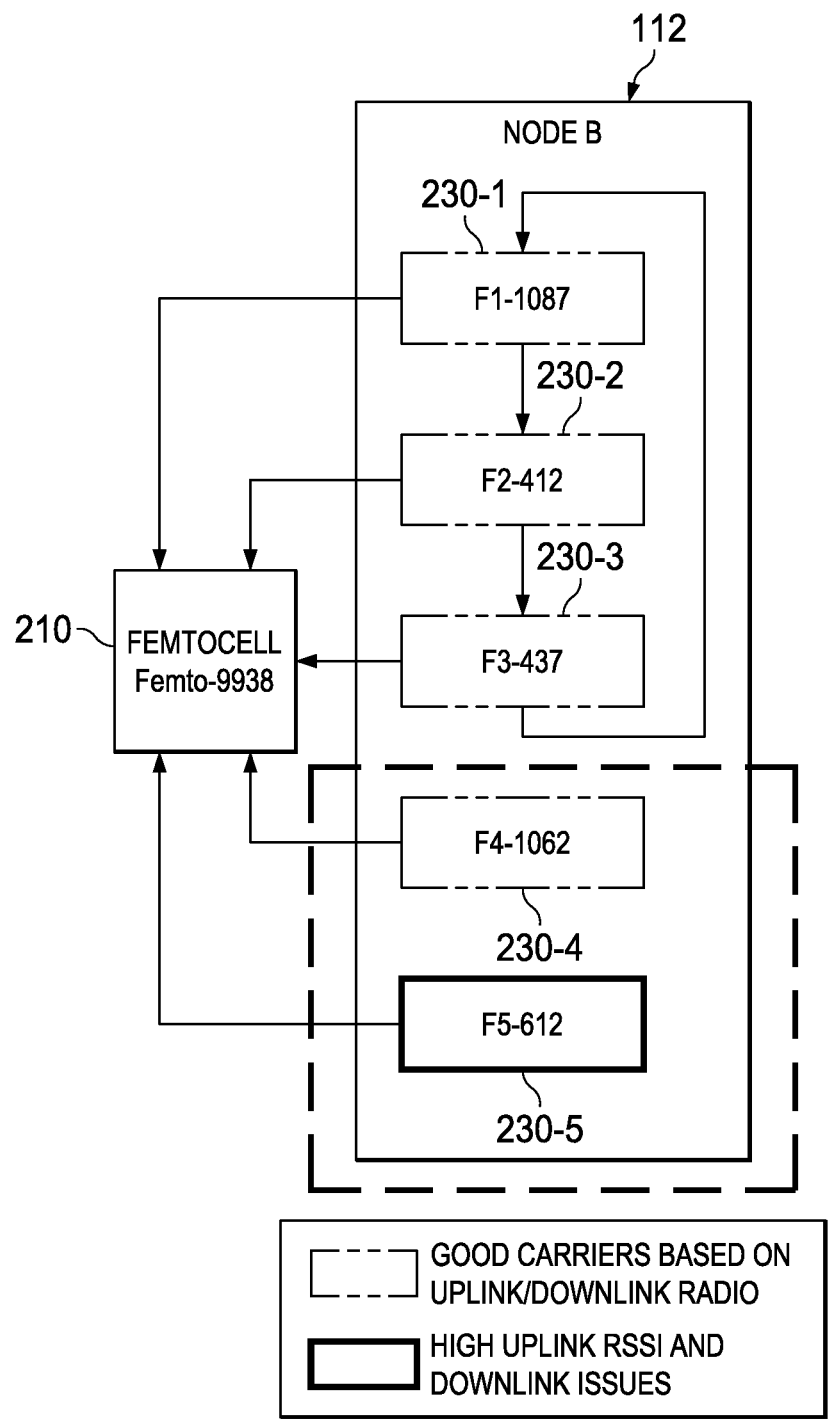
FIG. 5 is a block diagram of base station according to one or more examples of the present Specification.

FIG. 5 is a block diagram of NodeB 112 according to one or more examples of the present Specification. The embodiment of FIG. 5 provides a policy P and a scenario S in which power savings are a concern. For example, between certain times of day such as between midnight and 6 AM, it may be unnecessary to provide five carriers 230. Thus, it may be beneficial to shut down one or more carriers. In this case, policy P calls for shutting down carriers F4 230-4 and F5 230-5 to save power. This leaves three carriers, F1 230-1, F2 230-2, and F3 230-3 available for servicing femtocell 210. In this case, to provide the closed loop functionality, carriers F1 230-1, F2 230-2, and F3 230-3 are arranged in a linear closed loop fashion. This ensures that no traffic flows to either of carrier F4 230-4 and F5 230-5.

Figure 6:
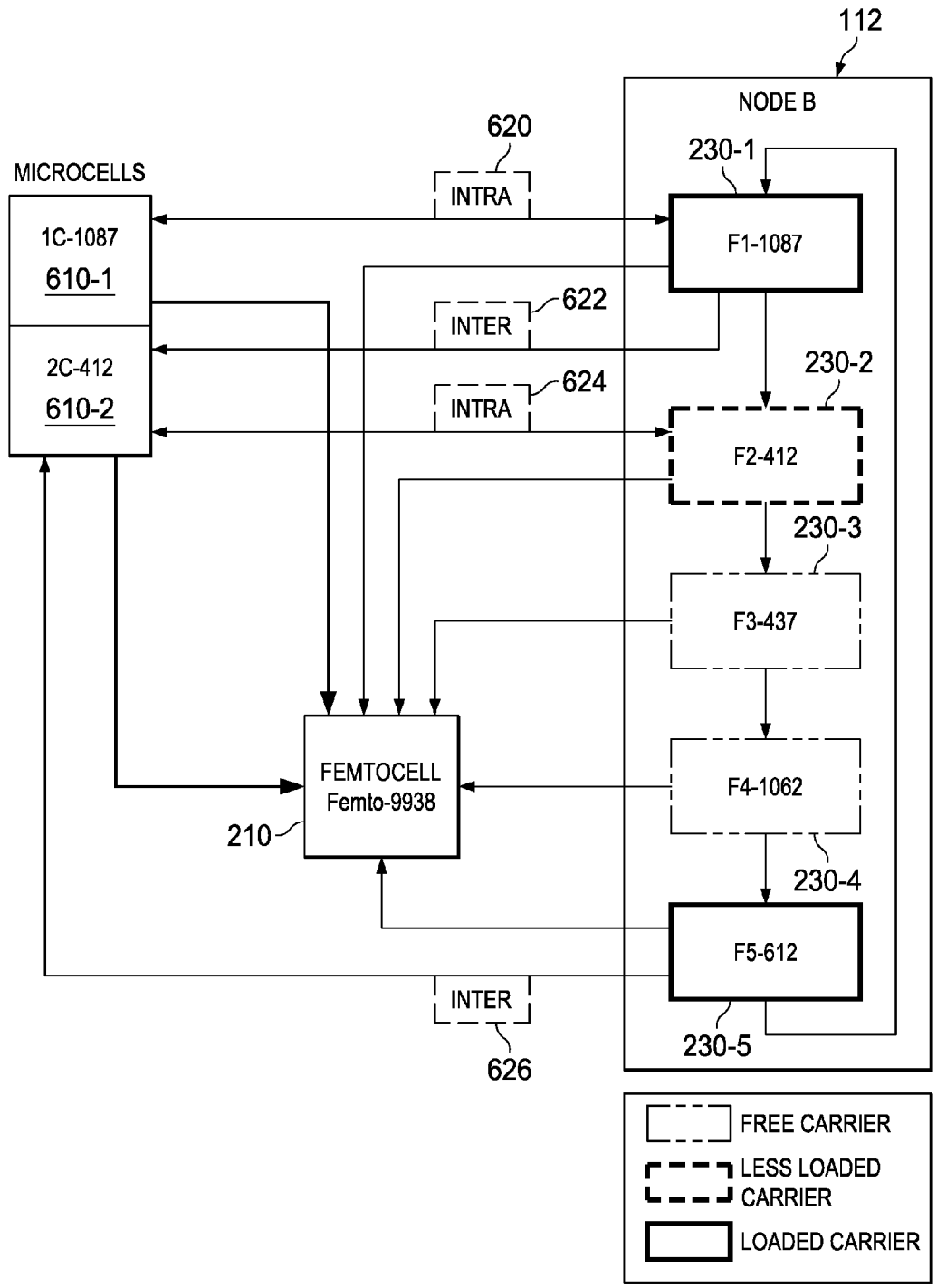
FIG. 6 is a block diagram of base station according to one or more examples of the present Specification.
Figure 7:
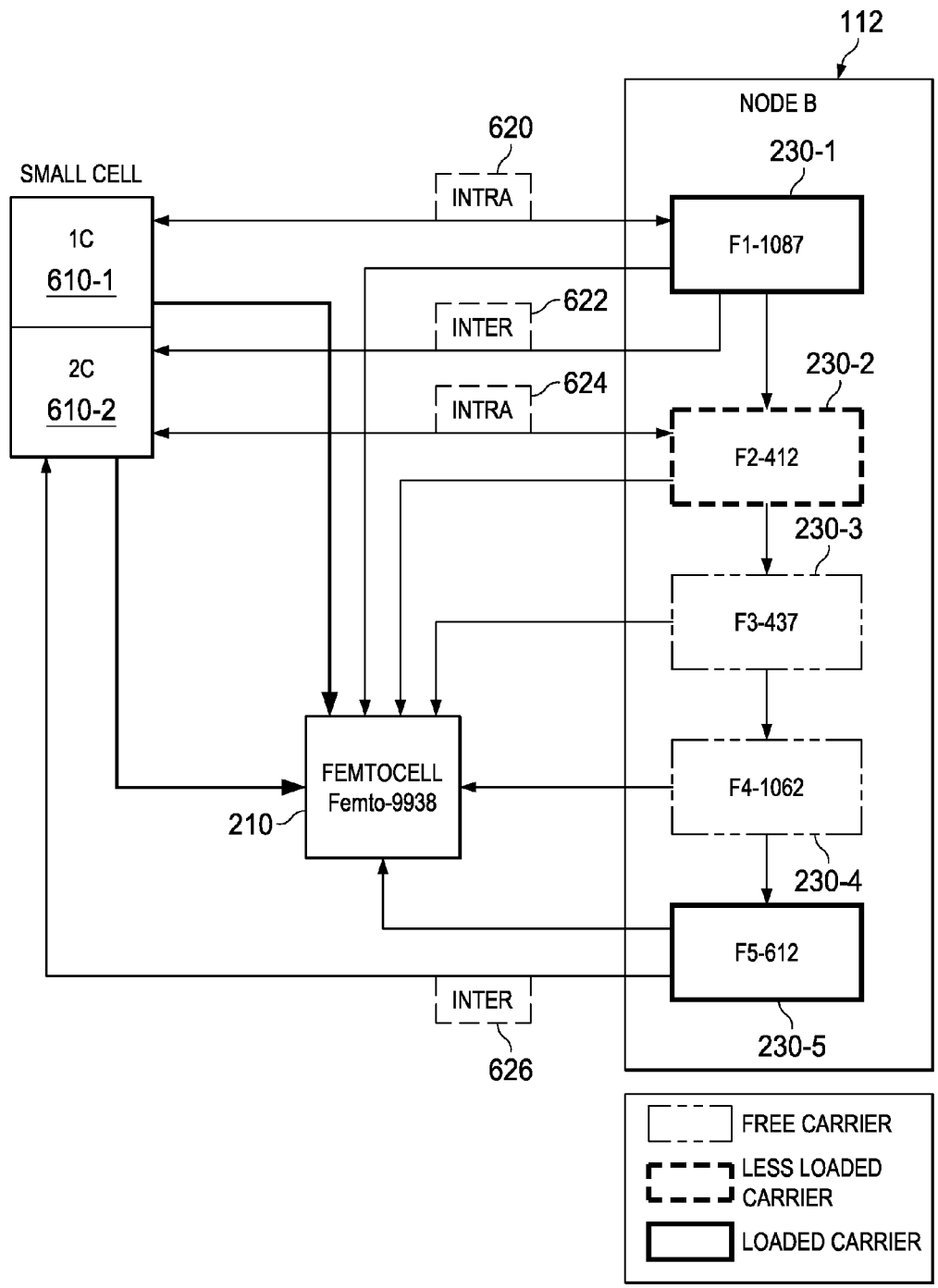
FIG. 7 is a block diagram of base station according to one or more examples of the present Specification.

FIGS. 6 and 7 provide block diagrams of NodeB 112 in which microcells 610-1 and 610-2 are also communicatively coupled to NodeB 112 and femtocell 210. Microcells 610 may be intermediate base stations, larger than femtocell 210 and smaller than NodeB 112. Microcells may be provided, for example, to cover a limited are such as a mall, office building, hotel, or concentrated commercial area. In this case, microcell 610-1 operates in the 1087 frequency carrier, like carrier F1 230-1. Microcell 610-2 operates on the 412 frequency carrier like carrier F2 230-2. Thus, connections between microcell 610-1 and carrier 230-1 are considered intrafrequency connections, while any connection between microcell 610-1 and any carrier other than carrier F1 230-1 is considered an interfrequency connection. Similarly, a connection between microcell 610-2 and carrier F2 230-2 is considered an intrafrequency connection, while a connection between microcell 610-2 and any carrier other than carrier F2 230-2 is considered an interfrequency connection.

This scenario S introduces additional complexity. As can be seen in FIG. 6, intrafrequency connections 620 and 624 are bi-directional connections. This is because carrier F1 230-1 does not need to "use up" one of its two allocated interfrequency neighbor associations to associate with microcell 610-1. Thus, carrier F1 230-1 can form neighbor associations with microcell 610-1, microcell 610-2, femtocell 210, and carrier F2 230-2. This can lead to substantial loading on carrier F1 230-1. In contrast, interfrequency connections 622 and 626 are unidirectional connections.

To alleviate this excessive loading, the feedback loop from loaded carrier F5 230-5 to F1 230-1 is removed in FIG. 7. This prevents loaded carrier F5 230-5 from directing yet additional traffic to loaded carrier F1 230-1.

Figure 8:
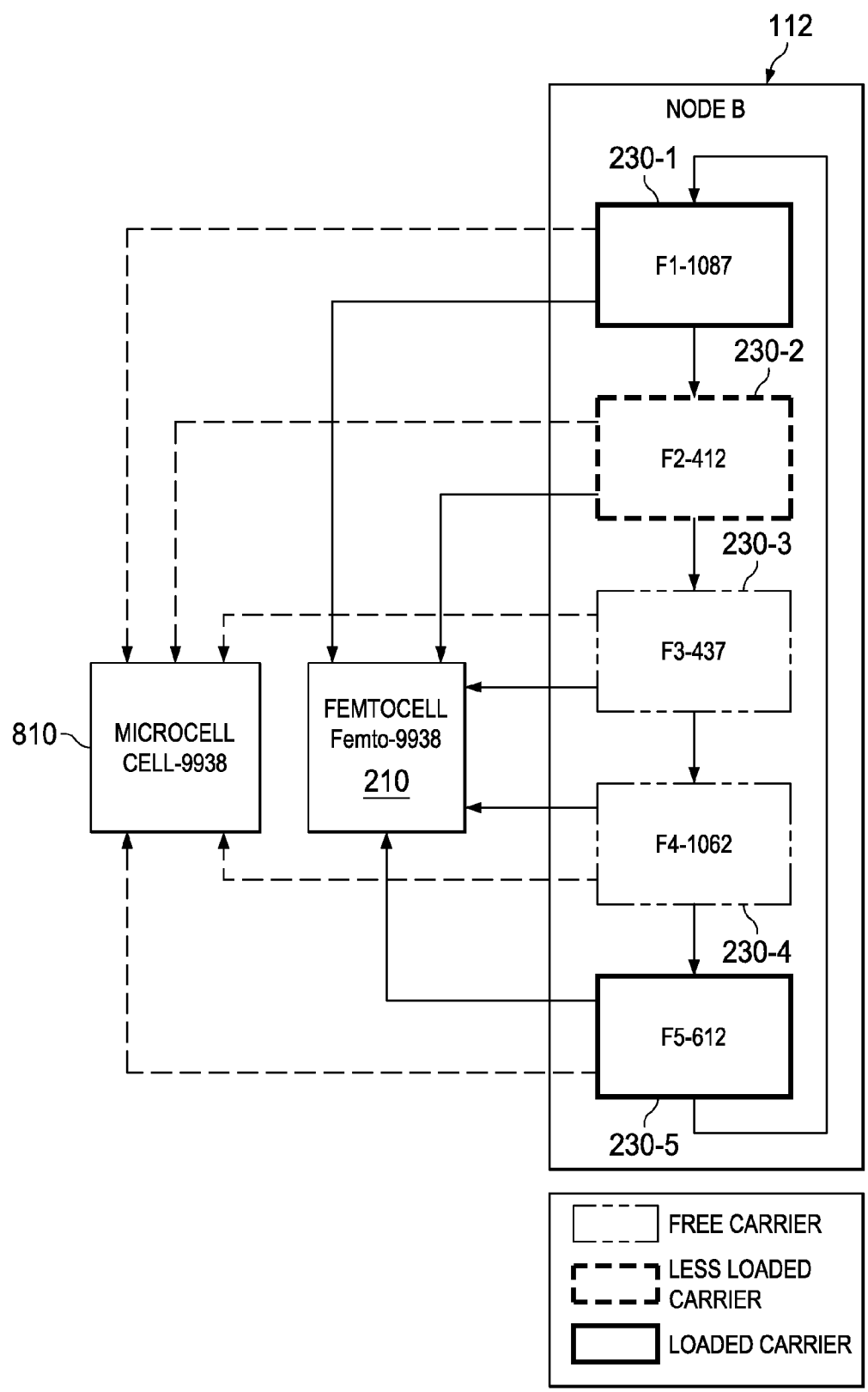
FIG. 8 is a block diagram of base station according to one or more examples of the present Specification.
Figure 9:
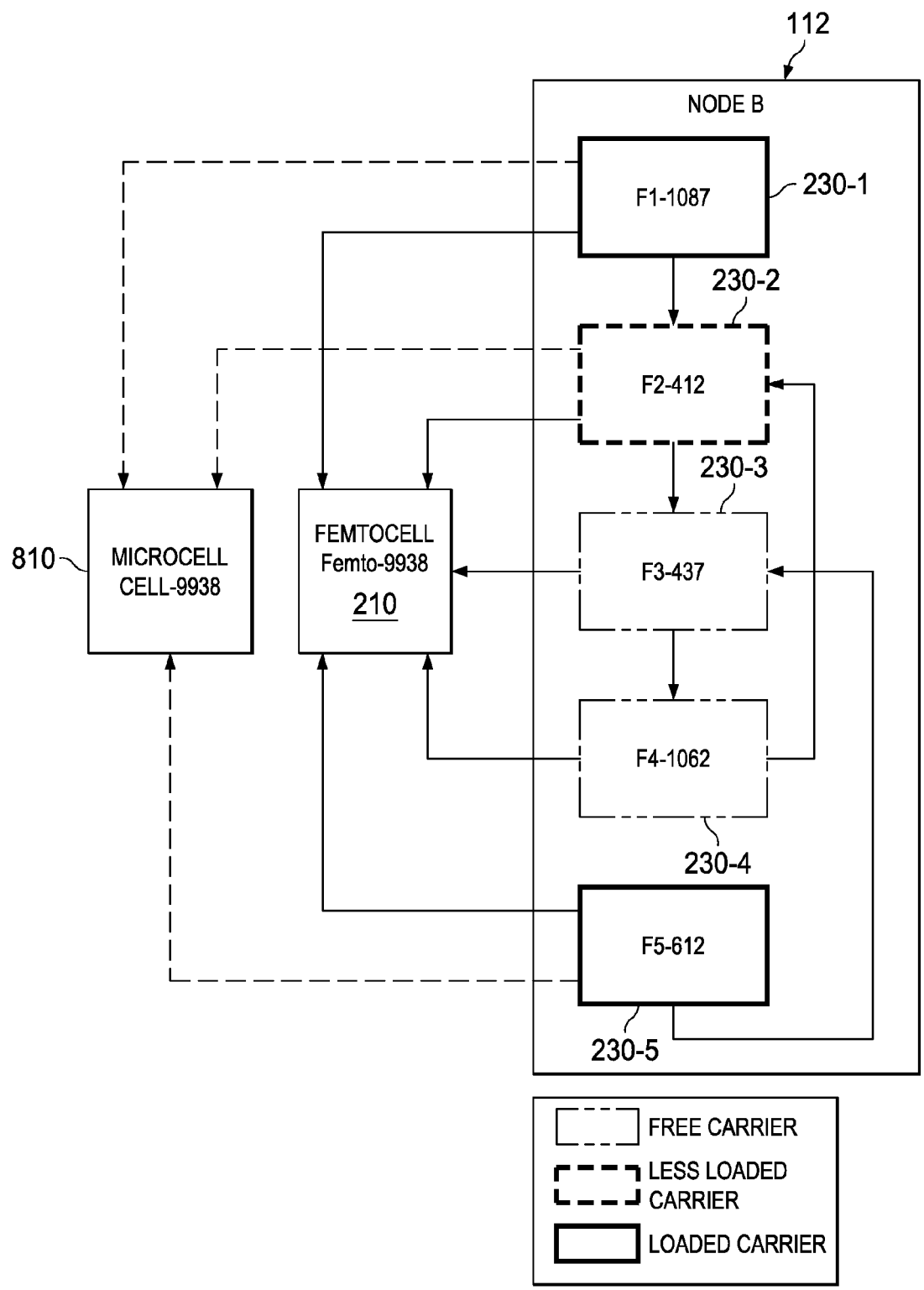
FIG. 9 is a block diagram of base station according to one or more examples of the present Specification.

FIGS. 8 and 9 are block diagrams of NodeB 112 according to one or more examples of the present Specification. In the examples of FIG. 8, a single microcell 810 is provided. In this case, microcell 810 operates on the same frequency carrier, namely 9938, that femtocell 210 operates on. Thus, all connections to carriers 230 are intrafrequency connections.

Figure 10:
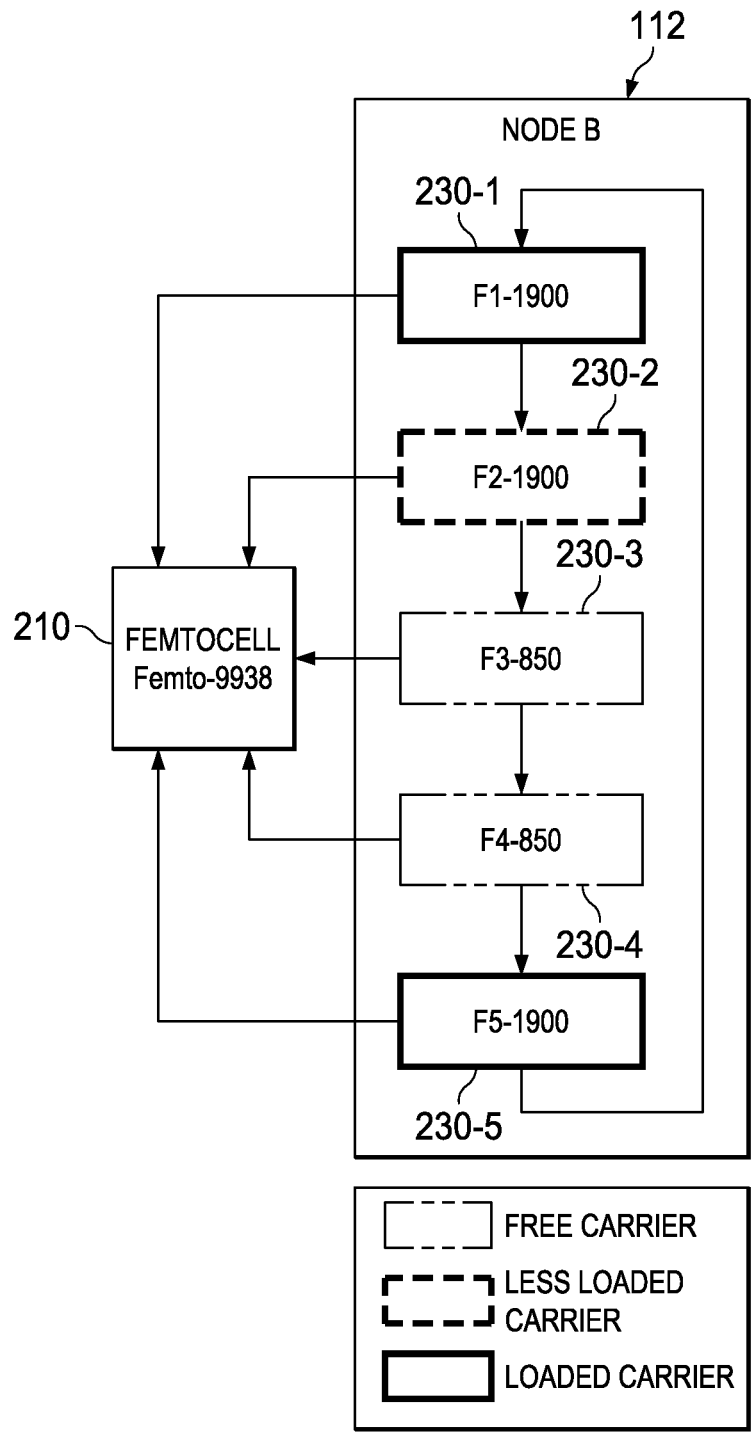
FIG. 10 is a block diagram of base station according to one or more examples of the present Specification.
Figure 11:
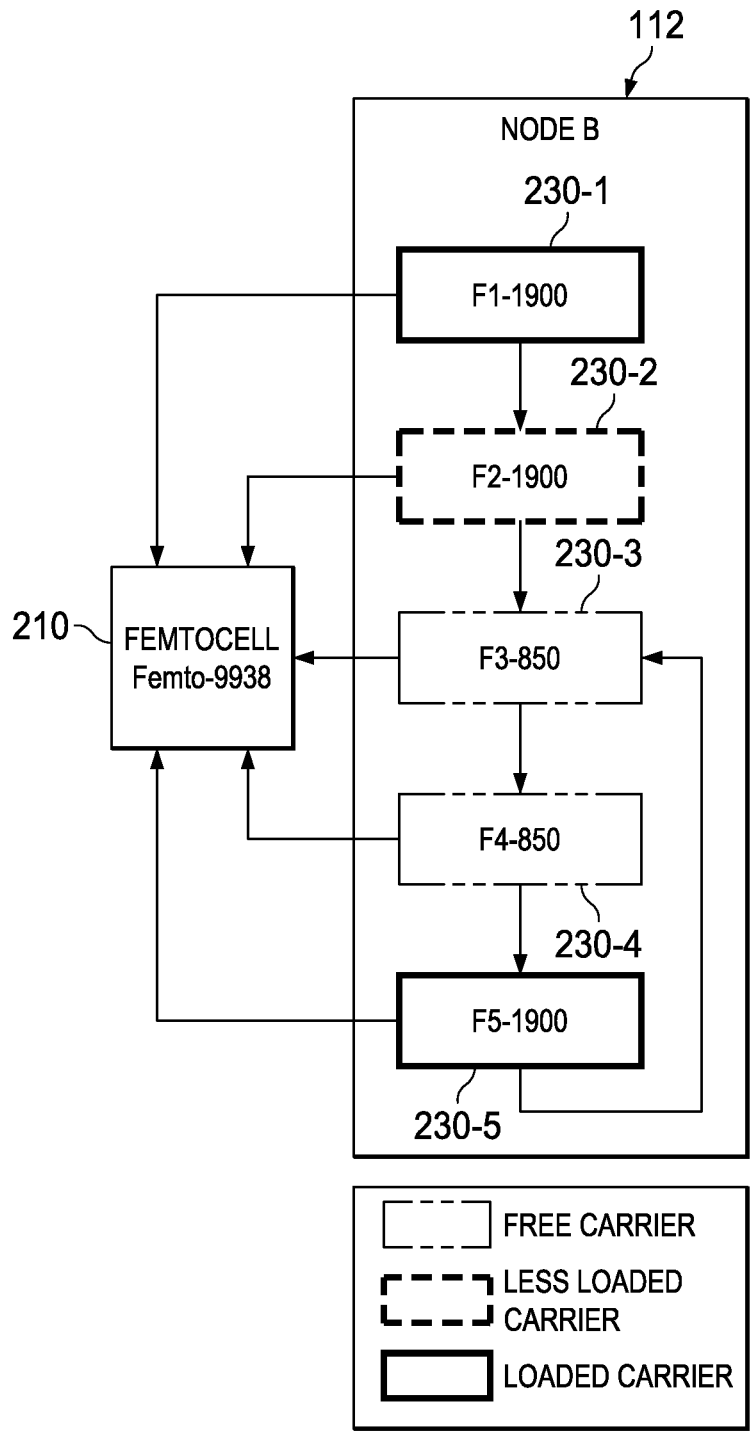
FIG. 11 is a block diagram of base station according to one or more examples of the present Specification.

FIGS. 10 and 11 are block diagrams of NodeB 112 according to one or more examples of the present Specification. In this example, carriers F1 230-1, F2 230-2, and F5 230-5 each provide an individual carrier frequency in the 1900 frequency band. Carriers F3 230-3 and F4 230-4 provide individual frequencies in the 850 frequency band. As with the individual UARFCNs, these frequency bands are managed and specified.

In this example, carriers F1 230-1 and F5 230-5 are loaded carriers. Carrier F2 230-2 is a less loaded carrier. Carriers F3 230-3 and F4 230-4 are free carriers. In this case, all of the carrier loading is occurring within the 1900 band, and none is occurring in the 850 band. Thus, it may not be useful to allow traffic to cascade over from carrier F5 230-5 to carrier F1 230-1. The neighbor relation between carrier F1 230-1 and F2 230-2 is also less useful, as this is still keeping the 1900 band overly congested. This loading of a frequency band can lead to loss of KPIs.

In FIG. 11, loading on the 1900 frequency band is alleviated. In this case, a policy P is provided that feeds back carrier F5 230-5 to carrier F3 230-3. This allows the network traffic to more efficiently "break out" of the 1900 frequency band and cascade into the available bandwidth on the 850 frequency band.

Figure 12:
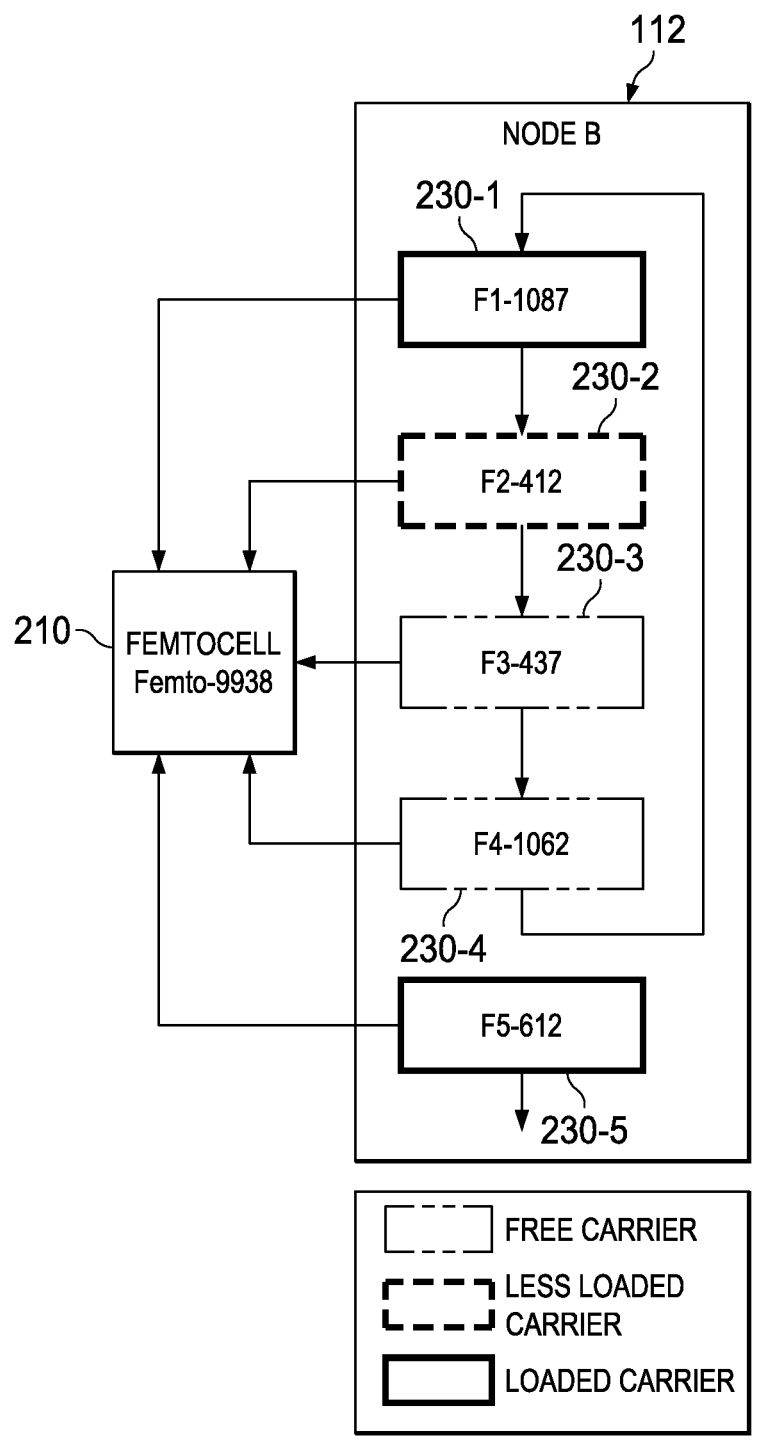
FIG. 12 is a block diagram of base station according to one or more examples of the present Specification.
Figure 13:
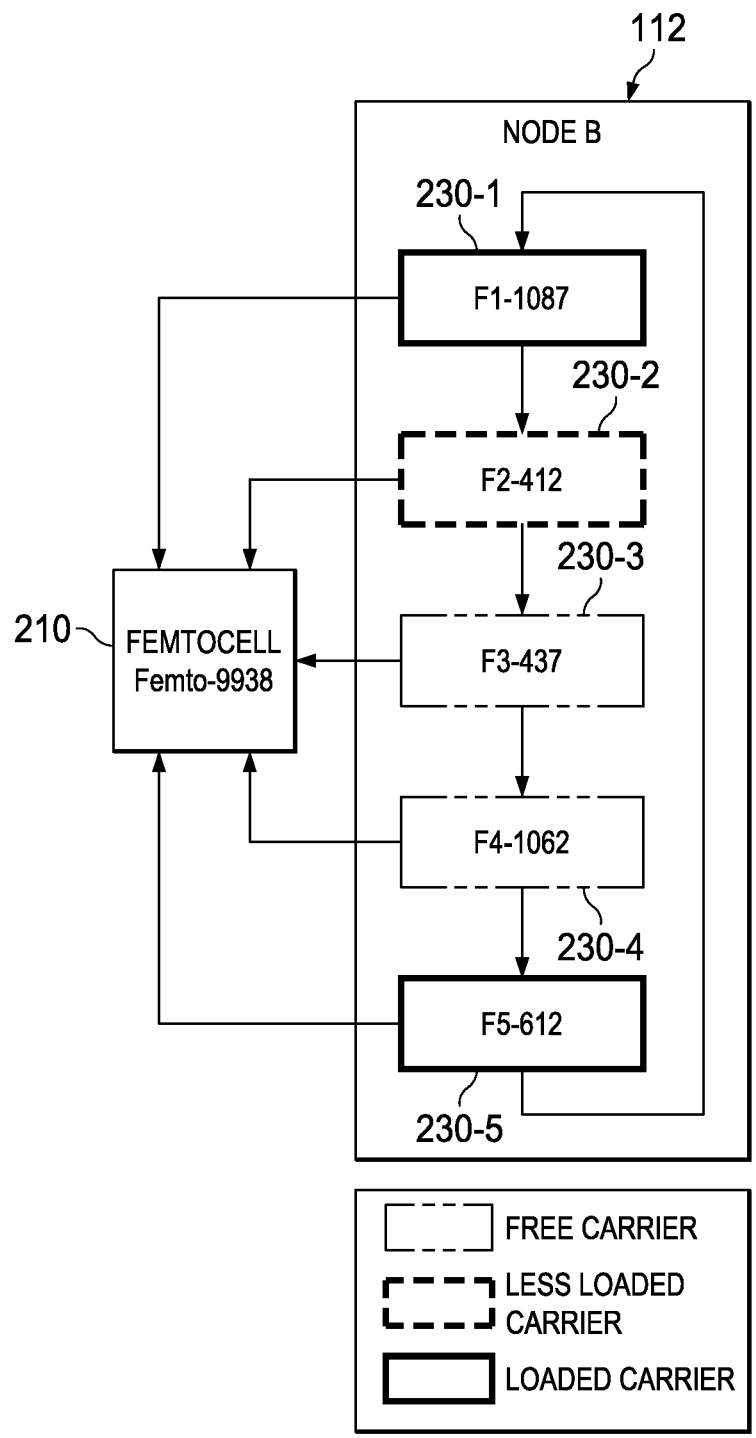
FIG. 13 is a block diagram of base station according to one or more examples of the present Specification.

FIGS. 12 and 13 are a block diagram of NodeB 112 disclosing dynamic integration of a new frequency carrier according to one or more examples of the present Specification. In this example, carriers F1 230-1, F2 230-2, F3 230-3, and F4 230-4 are already integrated into NodeB 112 and are arranged according to policy P0 in a linear feedback configuration. Carrier F5 230-5 is added to NodeB 112. Once NodeB 112 reports the presence of a new carrier F5 230-5 to C-SON 180, C-SON 180 provides configuration instructions for integrating carrier F5 230-5 into NodeB 112. In this case, C-SON 180 may define a new baseline policy P0 that includes carrier F5 230-5 in its linear feedback configuration.

Figure 14:
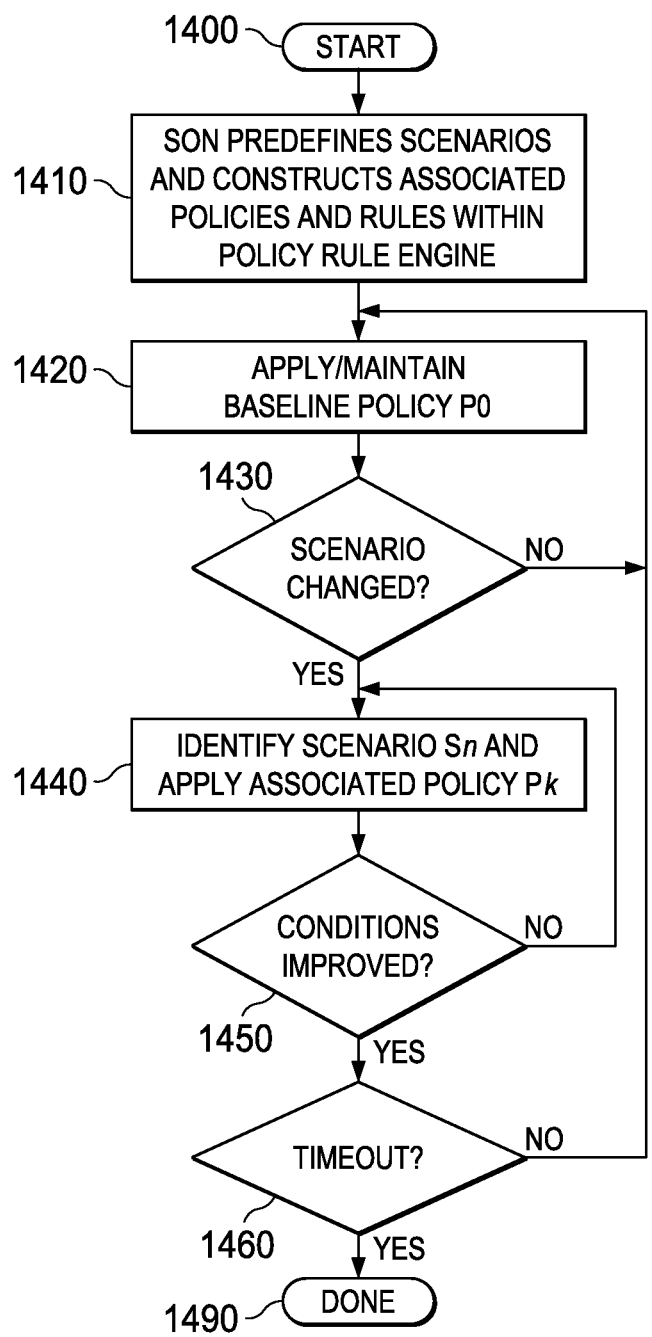
FIG. 14 is a flow diagram of a method according to one or more examples of the present Specification.

FIG. 14 is a block diagram of a method 1400 for providing automated interfrequency load balancing according to one or more examples of the present Specification.

In block 1410, C-SON 180 predefines certain scenarios and constructs for each scenario a related policy P. These may be designated as scenarios S0 . . . Sn and policies P0 . . . Pk. Each scenario S may have rules for identifying the scenario, and each policy P may have additional rules for implementing the policy P. In one example, the following policies are defined:

| Scenario | Definition | Policy |
| --- | --- | --- |
| S0 | Noise-based approach | P0 |
| S1 | Network conditions (congestion, outages, KPI, etc.) | P1 |
| S2 | Carrier-freeing energy saving policy | P2 |
| S3 | Resource based | P3 |
| S4 | Operator-defined conditions | P4 |
| S5 | Network/Carrier Borders | P5 |
| . . . | . . . | . . . |
| Sn | | Pk |

In block 1420, C-SON 180 sends to NodeB 112 a configuration directive for policy P0. The configuration directive is adapted to provide NodeB 112 the necessary information and instructions to implement policy P0 on NodeB 112. It should be noted that in this context, implementing policy P0 does not necessarily imply a direct literal translation of policy P0 onto NodeB 112. While it is possible in some cases for such a literal translation to occur, it is also possible in other cases for NodeB 112 to receive configuration directives, and within a configuration engine such as configuration engine 1524 (FIG. 15) to translate the configuration directives into locally-executable or usable instructions for NodeB 112.

In block 1430, C-SON 180 determines whether a new scenario Sn has been detected. If not, then in block 1420, C-SON 180 instructs NodeB 112 to continue to maintain baseline policy P0. In block 1440, if the scenario has changed, then C-SON 180 identifies a policy S and applies an associated policy Pk. It should be noted that mapping between scenario Sn and policy Pk need not be a one-to-one mapping. For example, a plurality of scenarios may all map to the same policy. In other examples, a plurality of policies may be mapped to the same scenario, and additional logic may be provided to select from among the policies. Thus, the designation of scenario Sn policy Pk is expressly intended to encompass a situation where there is a not a direct and literal one-to-one mapping between policies and scenarios.

In block 1450, SON 180 may measure one or more KPIs to determine whether network conditions have improved upon implementation of policy Pk. This may include, for example, measuring signal strength of connections, checking on load-balancing between the various carriers 230, checking for dropped calls and dropped packets, and checking for a user is not able to connect to the network. It should be noted, however, that many other feedback mechanisms are possible, and are intended to be encompassed within this Specification. Thus, block 1450 represents a feedback operation, in which SON 180 determines whether the change in policy has been productive, counterproductive, or neutral.

If conditions do not improve, then control may pass back to block 1420, where baseline policy P0 may be restored. In other cases, control may pass back to block 1440, so that SON 180 can determine whether there is another scenario S that better fits the present network conditions. In this case, identification of the correct scenario and policy may be an iterative process. One or more policies may be applied one or more times each, and the effect of each application may be measured to determine whether it has been productive in fact.

In block 1460, a timeout provision is provided. If the timeout occurs, then control passes back to block 1420, and baseline policy P0 may be restored. This may prevent NodeB 112 from getting stuck in a less-than-optimal policy, with no escape route. The use of such a timeout may also prevent C-SON 180 from getting "lazy." In other words, C-SON 180 must continuously reevaluate the current policy to determine whether there is a policy better suited to the present scenario under operating conditions.

In block 1490, the method is done.

FIG. 15 is a block diagram of a base station 112 according to one or more examples of the present Specification.

Base station 112 includes a processor 1510 connected to a memory 1520, having stored therein executable instructions for providing an operating system 1522, configuration engine 1524, and telecommunication engine 1526. Other components of base station 112 include a storage 1550, wireless network interface 1562, and auxiliary interface 1540.

In an example, processor 1510 is communicatively coupled to memory 1520 via memory bus 1570-3, which may be for example a direct memory access (DMA) bus. Processor 1510 may be communicatively coupled to other devices via a system bus 1570-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of hardware, software, or firmware providing programmable logic, including by way of non-limiting example a microprocessor, digital signal processor, field-programmable gate array, programmable logic array, application-specific integrated circuit, or virtual machine processor.

Processor 1510 may be connected to memory 1520 in a DMA configuration via DMA bus 1570-3. To simplify this disclosure, memory 1520 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 1520 may comprise a relatively low-latency volatile main memory, while storage 1550 may comprise a relatively higher-latency non-volatile memory. However, memory 1520 and storage 1550 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 1550 may be any species of memory 1520, or may be a separate device, such as a hard drive, solid-state drive, external storage, redundant array of independent disks (RAID), network-attached storage, optical storage, tape drive, backup system, cloud storage, or any combination of the foregoing. Storage 1550 may be, or may include therein, a database or databases or data stored in other configurations, and may include a stored copy of operational software such as an operating system and a copy of operating system 1522 and software portions of configuration engine 1524 and telecommunication engine 1526. Many other configurations are also possible, and are intended to be encompassed within the broad scope of this Specification.

Backhaul interface 1560 may be provided as a network interface to communicatively couple base station 112 to a wired or wireless backhaul network, such as for example an X2 network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

A wireless network interface 1562 is also provided for communicatively coupling base station 112 to wireless networks, including with UE 120 and other wireless devices.

Configuration engine 1524, in one example, is a utility or program that carries out a method, including receiving configuration directives from a SON and translating those configuration directives into local-executable configuration instructions. Configuration engine 1524 may be, in various embodiments, embodied in hardware, software, firmware, or some combination thereof. For example, in some cases, configuration engine 1524 may include a special integrated circuit designed to carry out a method, and may also include software instructions operable to instruct a processor to perform the method. It should also be noted that configuration engine 1524 is provided by way of non-limiting example only, and that other hardware and software, including interactive or user-mode software, may also be provided in conjunction with, in addition to, or instead of configuration engine 1524 to perform methods according to this Specification.

In one example, configuration engine 1524 includes executable instructions stored on a non-transitory medium operable to perform method all or part of one or more of the methods disclosed herein, or a similar method according to this Specification. At an appropriate time, such as upon booting base station 112 or upon a command from the operating system or a user, processor 1510 may retrieve a copy of configuration engine 1524 (or software portions thereof) from storage 550 and load it into memory 1520. Processor 1510 may then iteratively execute the instructions of configuration engine 1524.

Auxiliary interface 1540 is provided to interface to auxiliaries and peripherals, including any auxiliary device that connects to base station 112 but that is not necessarily a part of the core architecture of base station 112. A peripheral may be operable to provide extended functionality to base station 112, and may or may not be wholly dependent on base station 112. In some cases, a peripheral may be a computing device in its own right. Peripherals may include input and output devices such as test systems, displays, terminals, printers, keyboards, mice, modems, network controllers, sensors, transducers, actuators, controllers, data acquisition buses, cameras, microphones, speakers, or external storage by way of non-limiting example.

Figure 16:
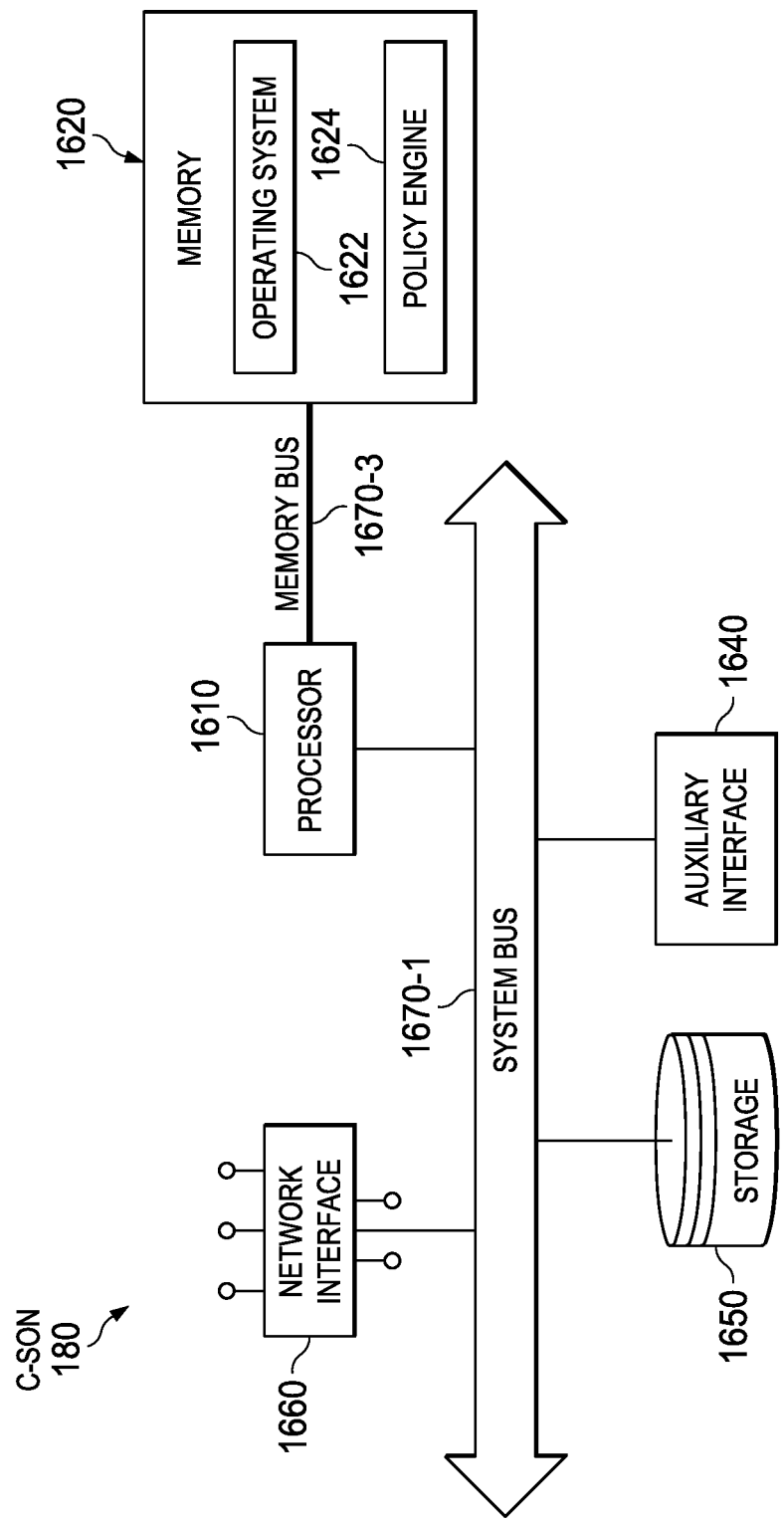
FIG. 16 is a block diagram of a SON controller according to one or more examples of the present Specification.

FIG. 16 is a block diagram of a C-SON 180 according to one or more examples of the present Specification. It should be noted that the definitions and example of FIG. 15 are equally applicable to reasonably corresponding devices and structures in FIG. 16.

C-SON 180 includes a processor 1610 connected to a memory 1620, having stored therein executable instructions for providing an operating system 1622, policy engine 1624. Other components of C-SON 180 include a storage 1650, network interface 1660, and auxiliary interface 1640.

In an example, processor 1610 is communicatively coupled to memory 1620 via memory bus 1670-3, which may be for example a direct memory access (DMA) bus. Processor 1610 may be communicatively coupled to other devices via a system bus 1670-1.

Processor 1610 may be connected to memory 1620 in a DMA configuration via DMA bus 1670-3. To simplify this disclosure, memory 1620 is disclosed as a single logical block, but in a physical embodiment may include one or more blocks of any suitable volatile or non-volatile memory technology or technologies. In certain embodiments, memory 1620 may comprise a relatively low-latency volatile main memory, while storage 1650 may comprise a relatively higher-latency non-volatile memory. However, memory 1620 and storage 1650 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 1650 may be any species of memory 1620, or may be a separate device. Storage 1650 may be, or may include therein, a database or databases or data stored in other configurations, and may include a stored copy of operational software such as an operating system and a copy of operating system 1622 and software portions of policy engine 1624. Many other configurations are also possible, and are intended to be encompassed within the broad scope of this Specification.

Network interface 1660 may be provided as a network interface to communicatively couple C-SON 180 to a wired or wireless network, such as for example an X2 network.

Policy engine 1624, in one example, is a utility or program that carries out a method, including receiving configuration directives from a SON and translating those configuration directives into local-executable configuration instructions. Policy engine 1624 may be, in various embodiments, embodied in hardware, software, firmware, or some combination thereof. For example, in some cases, policy engine 1624 may include a special integrated circuit designed to carry out a method, and may also include software instructions operable to instruct a processor to perform the method. It should also be noted that policy engine 1624 is provided by way of non-limiting example only, and that other hardware and software, including interactive or user-mode software, may also be provided in conjunction with, in addition to, or instead of policy engine 1624 to perform methods according to this Specification.

In one example, policy engine 1624 includes executable instructions stored on a non-transitory medium operable to perform method all or part of one or more of the methods disclosed herein, or a similar method according to this Specification. At an appropriate time, such as upon booting C-SON 180 or upon a command from the operating system or a user, processor 1610 may retrieve a copy of policy engine 1624 (or software portions thereof) from storage 1650 and load it into memory 1620. Processor 1610 may then iteratively execute the instructions of policy engine 1624.

Auxiliary interface 1640 is provided to interface to auxiliaries and peripherals, including any auxiliary device that connects to C-SON 180 but that is not necessarily a part of the core architecture of C-SON 180. A peripheral may be operable to provide extended functionality to C-SON 180, and may or may not be wholly dependent on C-SON 180.

Figure 17:
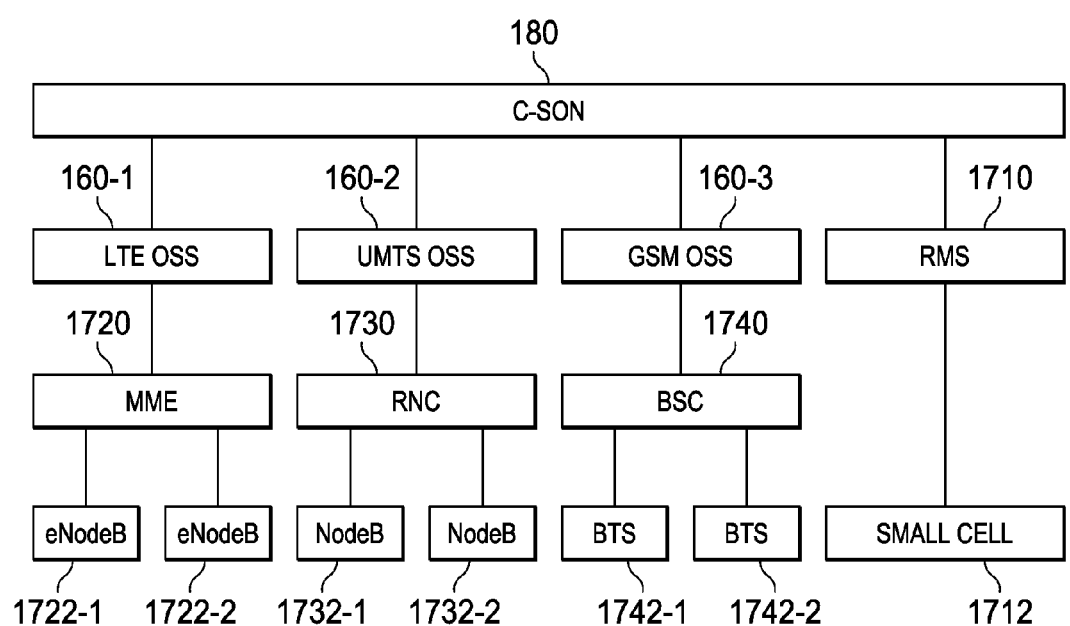
FIG. 17 is a block diagram of a telecommunication network according to one or more examples of the present Specification.

FIG. 17 is a block diagram of a telecommunication architecture according to one or more examples of the present Specification. In the example of FIG. 17, a heterogeneous telecommunication network (HETNET). In particular, a C-SON 180 is communicatively coupled to a plurality of OSSs 160, or other devices such as one or more remote management servers (RMS) 1710. LTE OSS 160-provides LTE OSS services to one or more LTE eNodeBs 1722, such as eNodeB 1722-1 and eNodeB 1722-2. One or more LTE mobility management entities (MME) 1720 may also be provided for control plane management functions, such as radio resource management, mobility management, encryption, and decryption.

UMTS OSS 160-2 is communicatively coupled to one or more UMTS NodeBs 1732, such as NodeB 1732-1 and NodeB 1732-2. One or more radio network controllers (RNC) 1730 may also be provided for control plane management functions, such as radio resource management, mobility management, encryption, and decryption.

GSM OSS 160-3 is communicatively coupled to one or more base stations 1742, such as base station 1742-1 and base station 1742-2. One or more base stations controller (BSC) 1740 may also be provided for control plane management functions, such as radio resource management, mobility management, encryption, and decryption.

Finally, RMS 1710 may be communicatively coupled to one or more small cell base stations 1712. Small cell base stations 1712 may operate on any suitable technology, including any of the technologies disclosed herein. Small cell 1712 may be configured to provide wireless network coverage to a small area such as a hotel, office building, park, or similar. In certain embodiments, small cell 1710 may be communicatively coupled to one or more base stations 1742, NodeBs 1732, or eNodeBs 1722.

Figure 18:
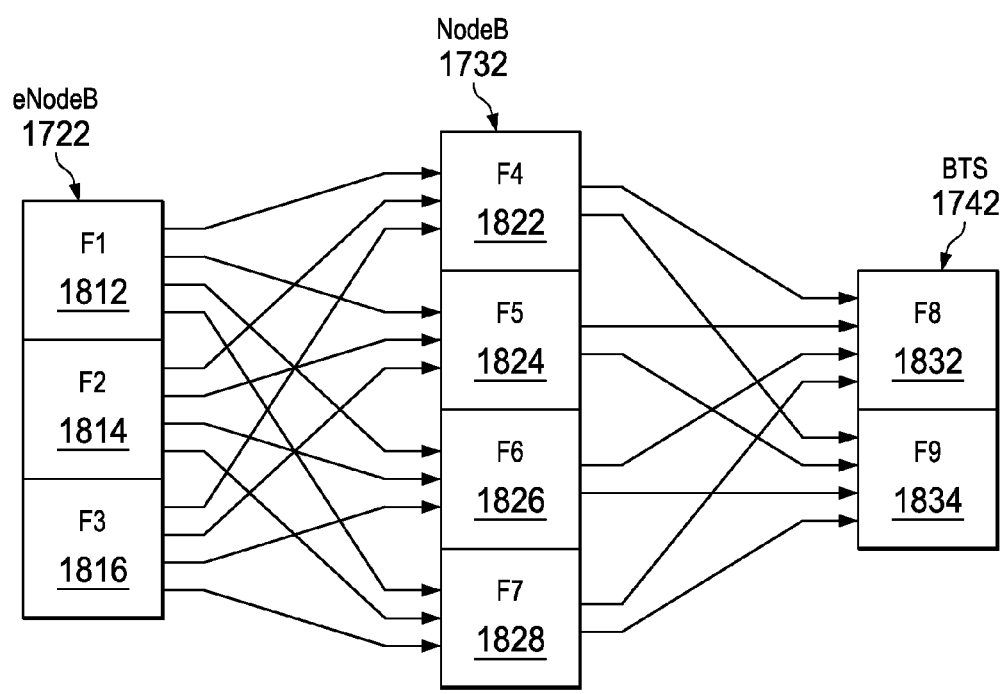
FIG. 18 is a block diagram of a base station according to one or more examples of the present Specification.

FIG. 18 is a block diagram of inter-technology neighbor relations according to one or more examples of the present Specification. In the example of FIG. 18, three carrier devices are provided, such as eNodeB 1722, NodeB 1732, and base transceiver station (BTS) 1742. In this example, eNodeB 1722 provides LTE network services, NodeB 1732 provides UMTS network services, and BTS 1742 provides GSM network services.

As in previous examples, each of the carriers of FIG. 18 is provisioned with a plurality of carrier frequencies. For example, eNodeB 1722 is provisioned with carriers F1 1812, F2 1814, and F3 1816. The frequency bands for these carriers may be any suitable band, as described above.

Similarly, NodeB 1732 is provisioned with carriers F4 1822, F5 1824, F6 1826, and F7 1828.

Finally, BTS 1742 is provisioned with F8 1832 and F9 1834.

In this example, each LTE carrier of eNodeB 1722 maintains an inter-technology neighbor relation with each UMTS carrier of NodeB 1732. Similarly, each UMTS carrier of NodeB 1732 maintains an inter-technology neighbor relation with each GSM carrier of BTS 1742.

This configuration, along with, in certain embodiments, management functions provided by C-SON 180, may enable inter-technology load balancing similar to the intra-technology load balancing described in certain of the preceding figures. In particular, C-SON 180 may perform a method such as method 1400 of FIG. 14 to provide inter-technology load balancing.

Figure 19:
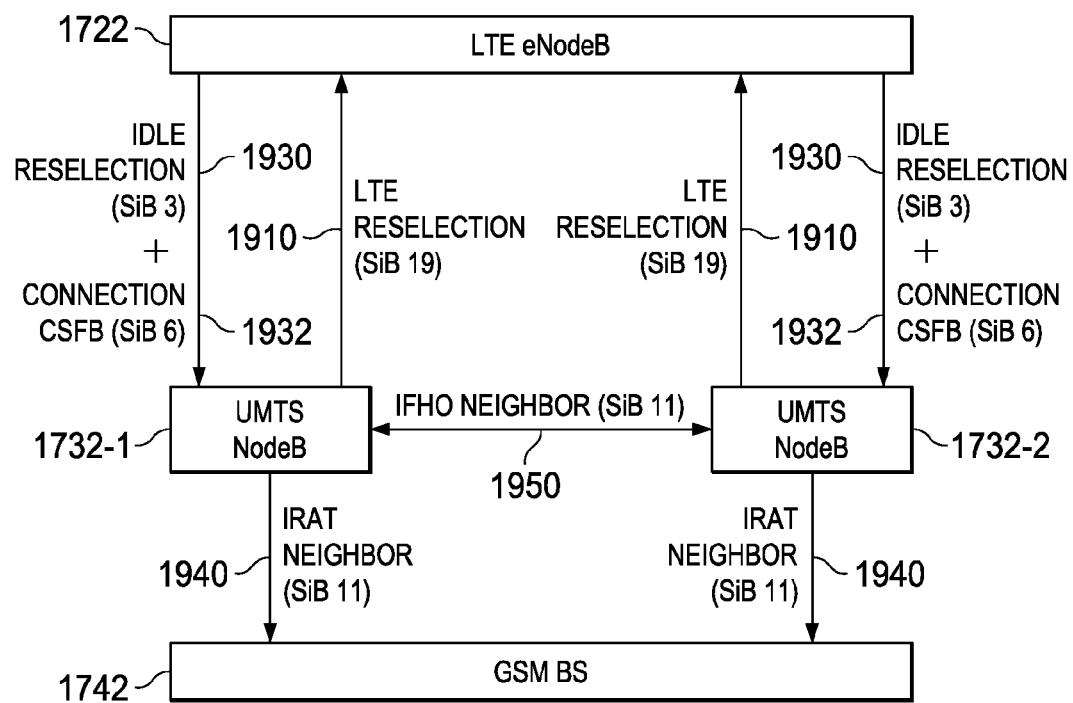
FIG. 19 is a block diagram of a telecommunication network according to one or more examples of the present Specification.

FIG. 19 is a signal flow diagram of certain aspects of inter-technology load balancing according to one or more examples of the present Specification. By way of example only, there is shown in this FIGURE one LTE eNodeB 1722 communicatively coupled to two UMTS NodeBs, namely NodeB 1732-1 and NodeB 1732-2.

As can be seen in this example, additional signaling may be required for certain inter-technology load balancing operations. For example, handoff from eNodeB 1722 to NodeB 1732 may require signals such as "IDLE RESELECTION" 1930, which is a system information block (SiB) type 3 (SiB3) message. SiB3 includes, for example, includes parameters for cell station configuration and re-selection. A connection circuit-switched fallback (CSFB) signal 1932 may also be required, which is a SiB6 signal. SiB6 includes, for example, parameters for configuration of common and shared physical channels to be used in a connected mode between cell stations.

Signaling may also occur between intra-technology peers, such as between UMTS NodeB 1732-1 and UMTS NodeB 1732-2. Specifically, these may be required to provide an "IFHO NEIGHBOR" signal, which is a SiB11 signal. SiB 11 contains, for example, measurement control information to be used in the cell.

UMTS NodeBs 1732 may also provide to GSM BTS 1742 an inter-radio access technology 1940 (IRAT) neighbor ("IRAT NEIGHBOR") signal, which is a SiB11 signal.

Finally, UMTS NodeBs 1732 may provide back to LTE eNodeB 1722 "LTE RESELECTION" signals 1910, which are SiB19 signals. SiB19 signals include, for example, IRAT frequency and priority information to be used for absolute RAT priority cell reselection algorithms.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips. Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. A network device, comprising:
an interface for coupling with a telecommunication engine operable for providing wireless uplink and downlink communication services in a plurality of frequency carriers in a cellular network configured in a baseline configuration P0, the baseline configuration P0 including a plurality of neighbor associations, each neighbor association identifying, for a respective first frequency carrier of the plurality of frequency carriers in the cellular network, a respective second frequency carrier of the plurality of frequency carriers in the cellular network to which traffic may overflow for load balancing, wherein each frequency carrier of the plurality of frequency carriers in the cellular network is associated with at least one of the neighbor associations; and a policy engine comprising at least a processor configured for:
- detecting a network condition scenario S1;
- looking up in a policy table a policy P1 associated with the scenario S1; and
- providing to the telecommunication engine configuration directives based on the policy P1, wherein the neighbor association associated with the first frequency carrier is changed from identifying the second frequency carrier to identifying a third frequency carrier of the plurality of frequency carriers in the cellular network to which traffic may overflow, wherein the third frequency carrier is not adjacent to the first frequency carrier.

2. The network device of claim 1, wherein the policy engine is further configured for:
- assessing network conditions after sending the configuration directives;
- determining that the configuration directives based on P1 have degraded network performance; and
- sending configuration directives to select a new policy Pn.

3. The network device of claim 1, wherein the policy engine is further configured for:
- assessing network conditions after sending the configuration directives;
- determining that the configuration directives based on P1 have degraded network performance;
- detecting a network condition scenario S2; and
- sending configuration directives based on a baseline policy P2.

4. The network device of claim 1, wherein the policy engine is further configured for, after a period, sending configuration directives to restore the baseline configuration P0.

5. The network device of claim 1, wherein the policy engine further comprises a plurality of network condition scenarios S, wherein at least some of the network condition scenarios S have associated therewith at least one policy P.

6. The network device of claim 5, wherein at least one of the network condition scenarios S is selected from the group consisting of carrier loading, power saving, interference, frequency band loading, noise, key performance indicators, congestion, outages, resource-based, operator-defined conditions, network or carrier borders, new technology, frequency cell turned on, and inter-technology load balancing.

7. The network device of claim 1, wherein the network device further comprises a self-organizing network engine for providing self-organizing network services.

8. One or more tangible, non-transitory computer-readable mediums having stored thereon instructions operable to instruct a processor for:
coupling with a telecommunication engine operable for providing wireless uplink and downlink communication services in a plurality of frequency carriers in a cellular network configured in a baseline configuration P0, the baseline configuration P0 including a plurality of neighbor associations, each neighbor association identifying, for a respective first frequency carrier of the plurality of frequency carriers in the cellular network, a respective second frequency carrier of the plurality of frequency carriers in the cellular network to which traffic may overflow for load balancing, wherein each frequency carrier of the plurality of frequency carriers in the cellular network is associated with at least one of the neighbor associations; and providing a policy engine configured for:
- detecting a network condition scenario S1;
- looking up in a policy table a policy P1 associated with the scenario S1; and
- providing to the telecommunication engine configuration directives based on the policy P1, wherein the neighbor association associated with the first frequency carrier is changed from identifying the second frequency carrier to identifying a third frequency carrier of the plurality of frequency carriers in the cellular network to which traffic may overflow, wherein the third frequency carrier is not adjacent to the first frequency carrier.

9. The one or more mediums of claim 8, wherein the policy engine is further configured for:
- assessing network conditions after sending the configuration directives;
- determining that the configuration directives based on P1 have degraded network performance; and
- sending configuration directives to select a new policy Pn.

10. The one or more mediums of claim 8, wherein the policy engine is further configured for:
- assessing network conditions after sending the configuration directives;
- determining that the configuration directives based on PI have degraded network performance;
- detecting a network condition scenario S2; and
- sending configuration directives based on a baseline policy P2.

11. The one or more mediums of claim 8, wherein the policy engine is further configured for, after a period, sending configuration directives to restore the baseline configuration P0.

12. The one or more mediums of claim 8, wherein the policy engine further comprises a plurality of network condition scenarios S, wherein at least some of the network condition scenarios S have associated therewith at least one policy P.

13. The one or more mediums of claim 12, wherein at least one of the network condition scenarios S is selected from the group consisting of carrier loading, power saving, interference, frequency band loading, noise, key performance indicators, congestion, outages, resource-based, operator-defined conditions, network or carrier borders, new technology, frequency cell turned on, and inter-technology load balancing.

14. The one or more mediums of claim 8, wherein the instructions are further operable for providing self-organizing network services.

15. A method comprising:
coupling with a telecommunication engine operable for providing wireless uplink and downlink communication services in a plurality of frequency carriers in a cellular network configured in a baseline configuration P0, the baseline configuration P0 including a plurality of neighbor associations, each neighbor association identifying, for a respective first frequency carrier of the plurality of frequency carriers in the cellular network, a respective second frequency carrier of the plurality of frequency carriers in the cellular network to which traffic may overflow for load balancing, wherein each frequency carrier of the plurality of frequency carriers in the cellular network is associated with at least one of the neighbor associations;
detecting a network condition scenario S1;
looking up in a policy table a policy P1 associated with the scenario S1; and
providing to the telecommunication engine configuration directives based on the policy P1, wherein the neighbor association associated with the first frequency carrier is changed from identifying the second frequency carrier to identifying a third frequency carrier of the plurality of frequency carriers in the cellular network to which traffic may overflow, wherein the third frequency carrier is not adjacent to the first frequency carrier.

16. The method of claim 15, further comprising:
assessing network conditions after sending the configuration directives;
determining that the configuration directives based on PI have degraded network performance; and
sending configuration directives to select a new policy Pn.

17. The method of claim 15, further comprising:
assessing network conditions after sending the configuration directives;
determining that the configuration directives based on P1 have degraded network performance;
detecting a network condition scenario S2; and
sending configuration directives based on a baseline policy P2.

18. The method of claim 15, further comprising, after a period, sending configuration directives to restore the baseline configuration P0.

19. The method of claim 15, further comprising identifying one of a plurality of network condition scenarios S, wherein at least some of the network condition scenarios S have associated therewith at least one policy P.

20. The method of claim 19, wherein at least one of the network condition scenarios S is selected from the group consisting of carrier loading, power saving, interference, frequency band loading, noise, key performance indicators, congestion, outages, resource-based, operator-defined conditions, network or carrier borders, new technology, frequency cell turned on, and inter-technology load balancing.

* * * * *

UNITED STATES PATENT AND TRADEMARK OFFICE
CERTIFICATE OF CORRECTION

PATENT NO. : 9,923,772 B2  
APPLICATION NO. : 14/333261  
DATED : March 20, 2018  
INVENTOR(S) : Ashish Bansal Page 1 of 1

It is certified that error appears in the above-identified patent and that said Letters Patent is hereby corrected as shown below:

In the Specification

In Column 13, Line 26, delete "550" and insert -- 1550 --, therefor.

In Column 14, Line 57, delete "160-provides" and insert -- 160-1 provides --, therefor.

Signed and Sealed this  
Thirty-first Day of July, 2018

Andrei Iancu  
*Director of the United States Patent and Trademark Office*